United States Patent [19]
Tanaka et al.

[11] Patent Number: 5,486,967
[45] Date of Patent: Jan. 23, 1996

[54] MAGNETIC DISK MEMORY SYSTEM

[75] Inventors: Yoichiro Tanaka, Kawasaki; Kazushi Tanimoto, Tokyo; Hiroshi Ohashi, Tokyo; Takashi Hikosaka, Tokyo; Yasuo Ohtsubo; Shigeru Hoshina, both of Yokohama, all of Japan

[73] Assignee: Kabushiki Kaisha Toshiba, Kawasaki, Japan

[21] Appl. No.: 212,120

[22] Filed: Mar. 14, 1994

[30] Foreign Application Priority Data

Mar. 15, 1993 [JP] Japan ................... 5-054367

[51] Int. Cl.$^6$ ................ G11B 5/39; G11B 5/31
[52] U.S. Cl. ................ 360/113; 360/104
[58] Field of Search ................ 360/113, 103, 360/102, 104

[56] References Cited

U.S. PATENT DOCUMENTS

| | | | |
|---|---|---|---|
| 4,901,185 | 2/1990 | Kubo et al. | 360/104 |
| 5,041,932 | 8/1991 | Hamilton | 360/104 |
| 5,223,998 | 6/1993 | Tokuyama et al. | 360/103 |

FOREIGN PATENT DOCUMENTS

| | | | |
|---|---|---|---|
| 53-25488 | 7/1978 | Japan . | |
| 60-85476 | 5/1985 | Japan | 360/103 |
| 62-3476 | 1/1987 | Japan . | |
| 62-24848 | 5/1987 | Japan . | |
| 63-138580 | 6/1988 | Japan | 360/103 |
| 63-67250 | 12/1988 | Japan . | |
| 3178017 | 8/1991 | Japan . | |

*Primary Examiner*—John H. Wolff
*Attorney, Agent, or Firm*—Cushman, Darby & Cushman

[57] ABSTRACT

According to the present invention, there is provided a magnetic disk memory system. An embodiment of this system comprises a magnetic disk of a perpendicular recording type, including a soft magnetic backing layer and a magnetic recording layer of a perpendicular magnetic anisotropy formed on the backing layer, and a magnetic head for writing or reading of data with respect to the magnetic disk, wherein the magnetic head comprises (a) a pair of main magnetic poles each of which made of a material having a high magnetic permeability, one end of the each pole being located so as to face the magnetic disk surface, (b) a non-magnetic interlayer provided between two main magnetic poles of the pair, (c) a recording coil disposed so as to generate a magnetic flux passing through the magnetic disk via the main magnetic poles, and (d) an MR element provided via an insulation layer on the other ends of the pair of main magnetic poles, one MR element having a film surface parallel to end surfaces of the other ends of the main magnetic poles, and being magnetically coupled with the pair of main magnetic poles.

20 Claims, 28 Drawing Sheets

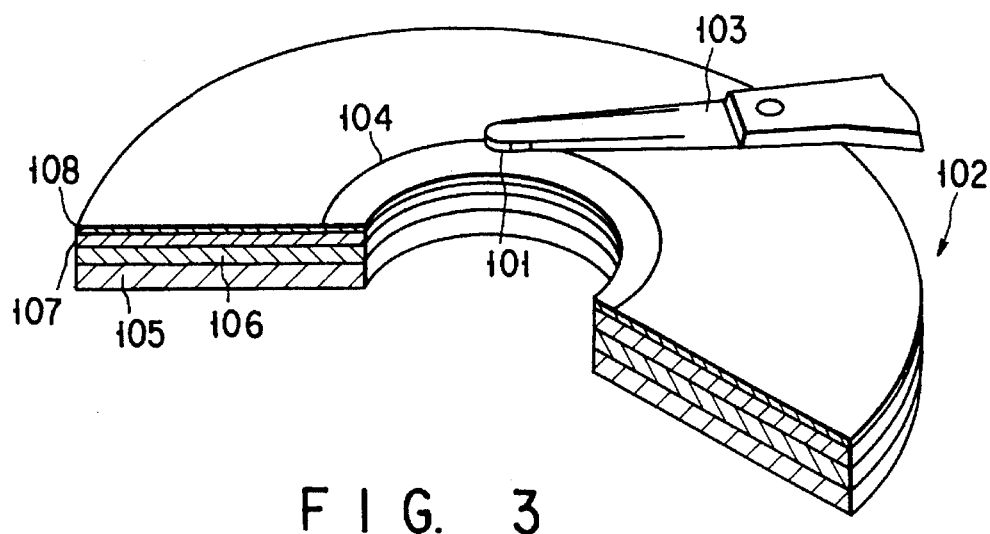
F I G. 3
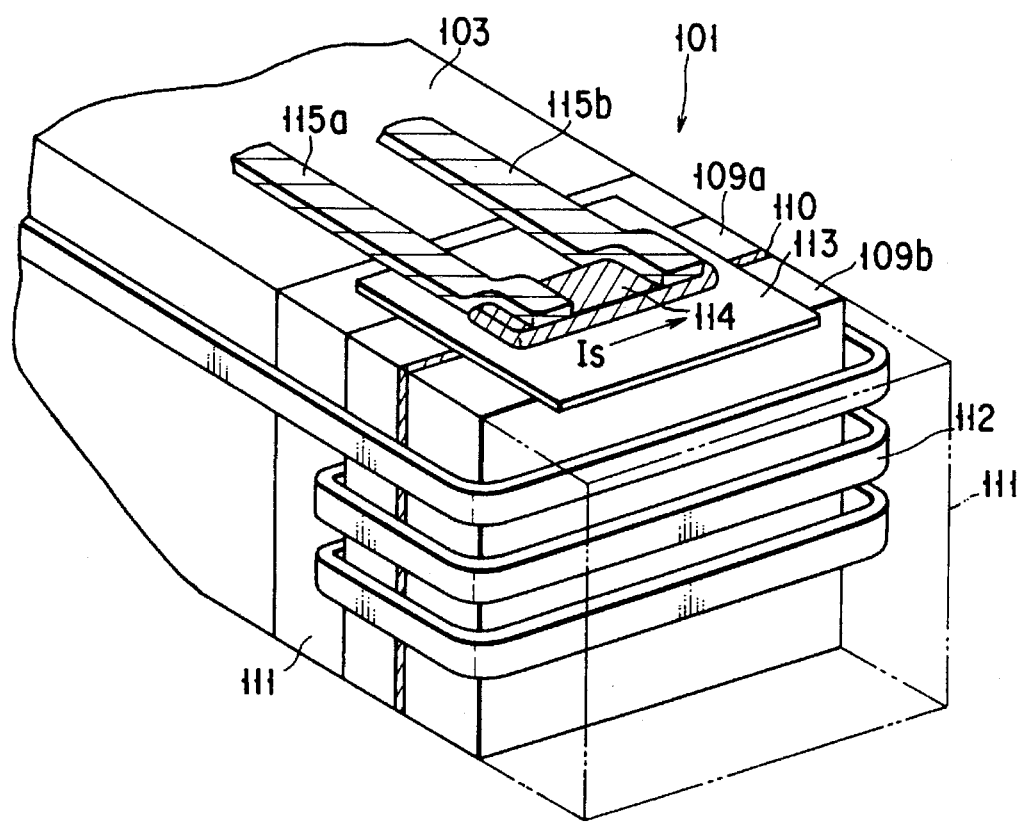
F I G. 5

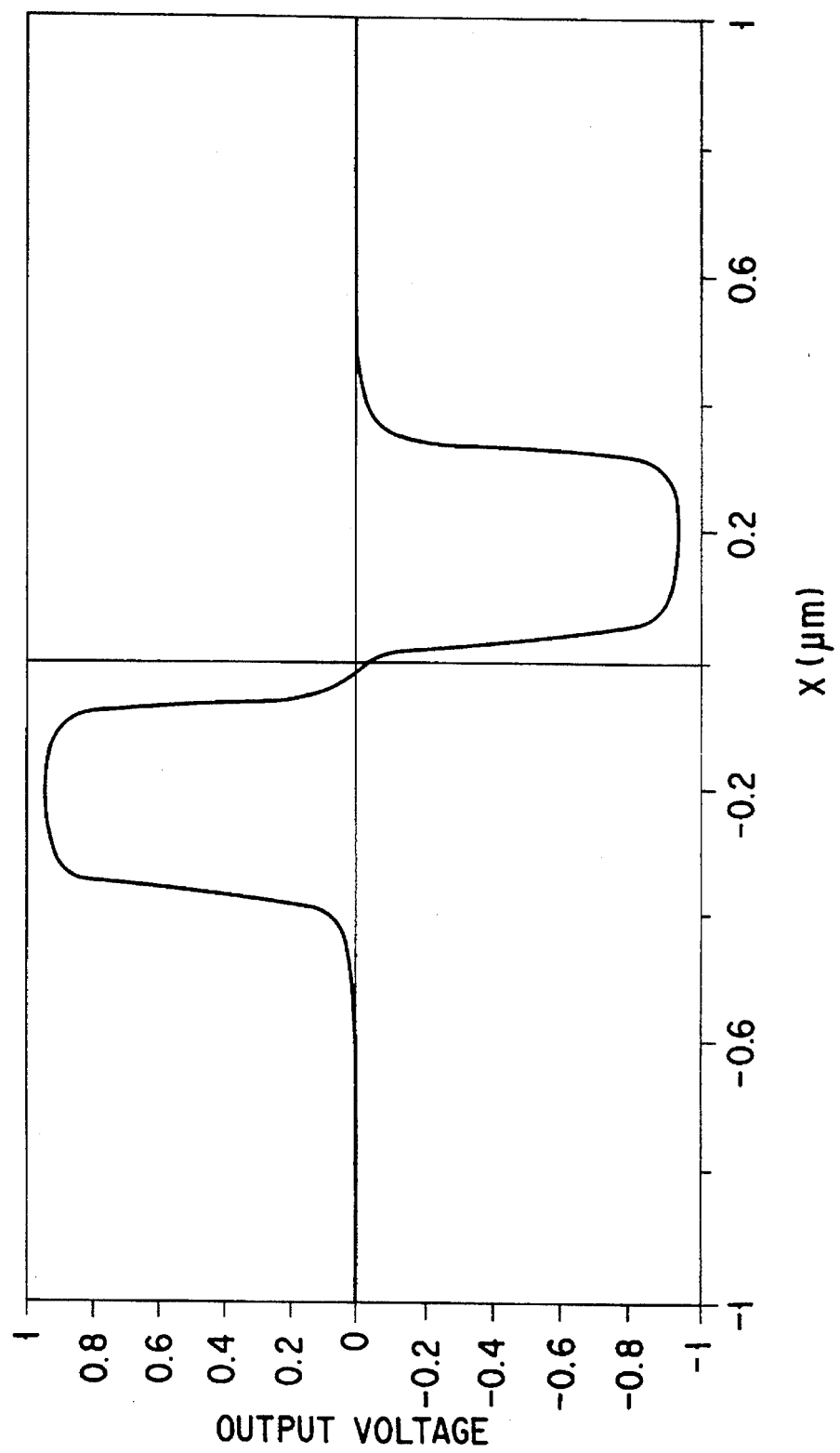
F I G. 12

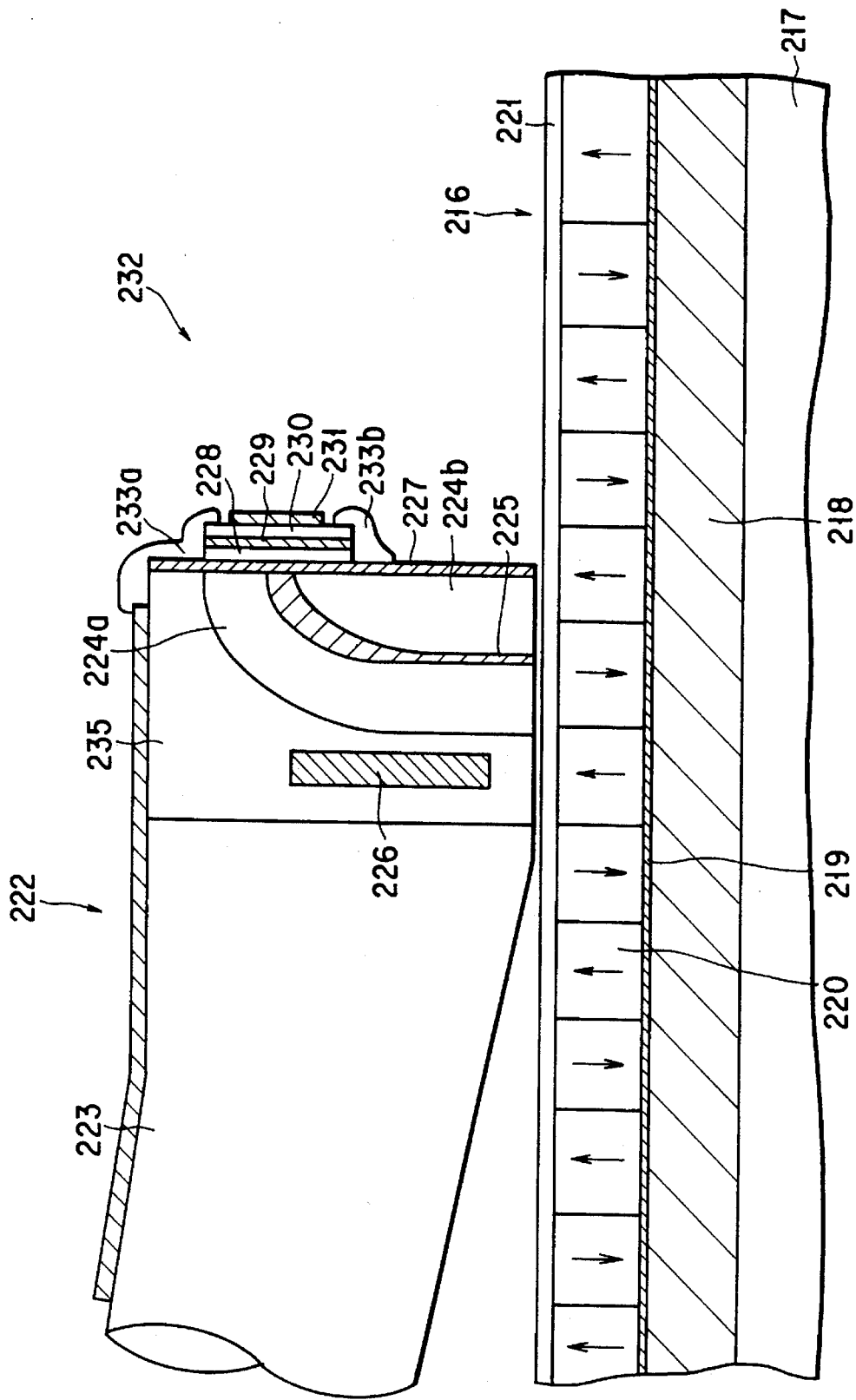
F I G. 14

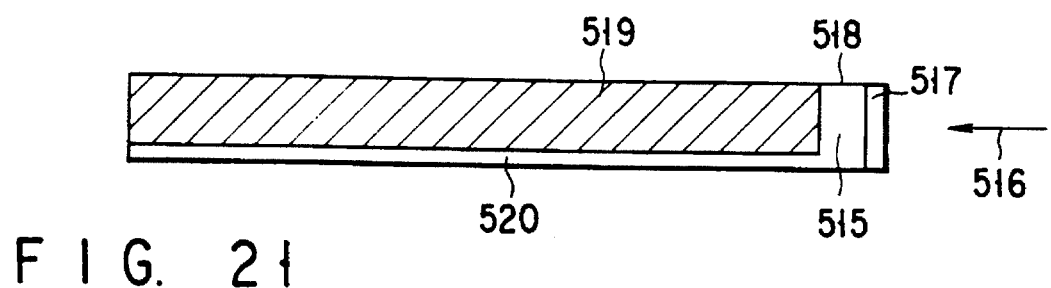
F I G. 21
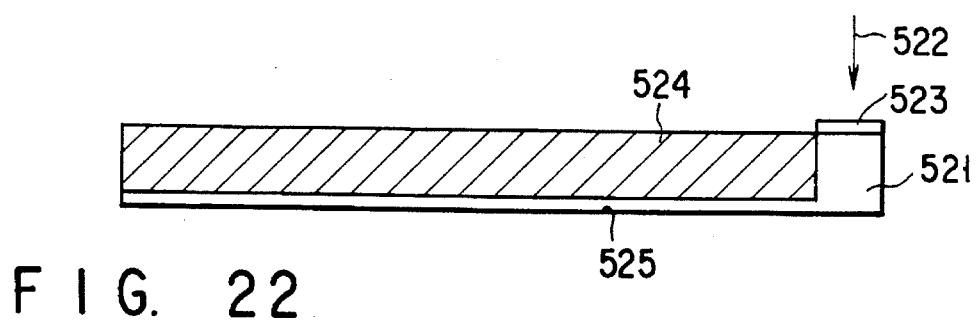
F I G. 22
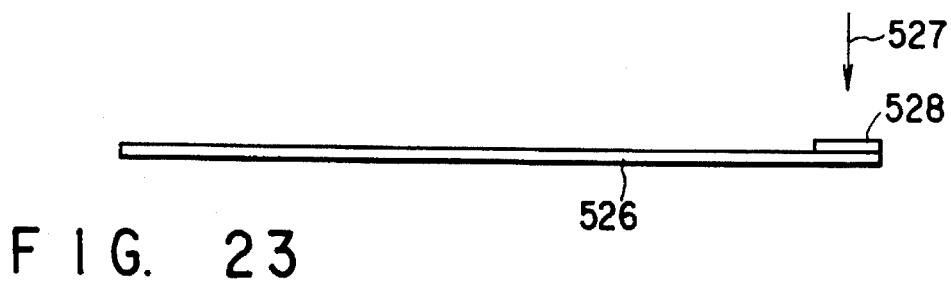
F I G. 23
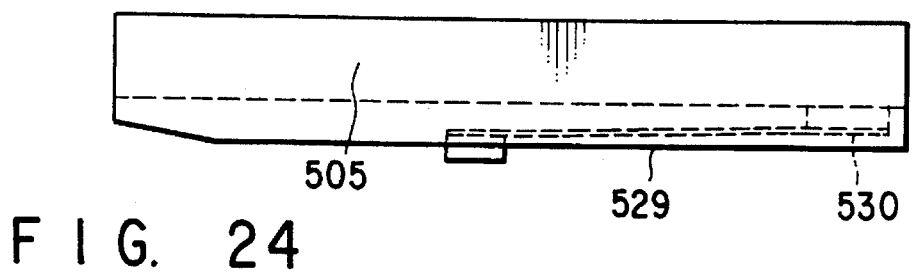
F I G. 24

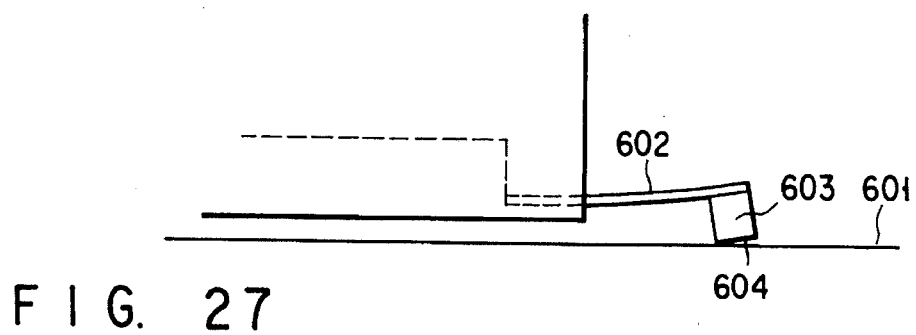
F I G. 27
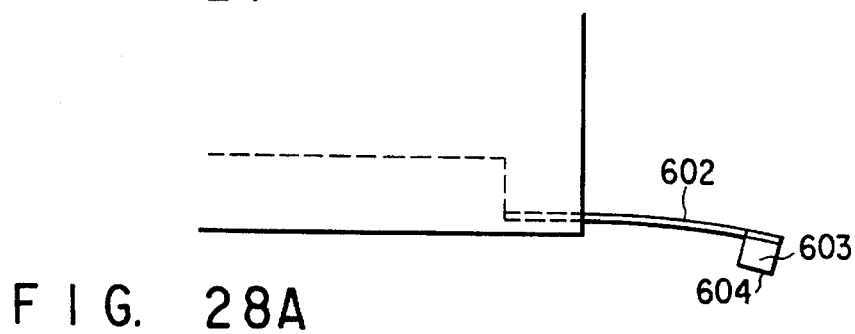
F I G. 28A
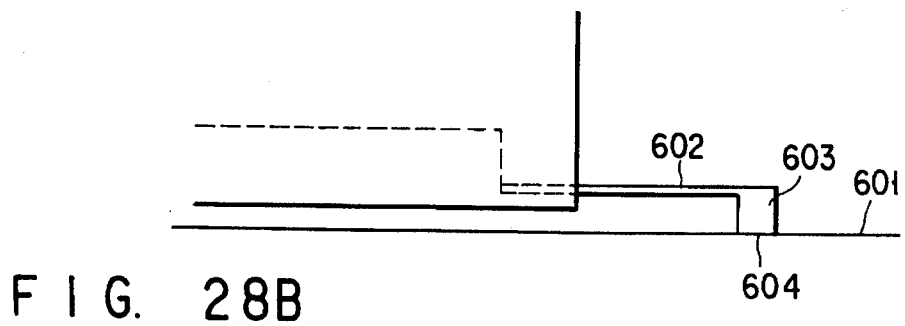
F I G. 28B
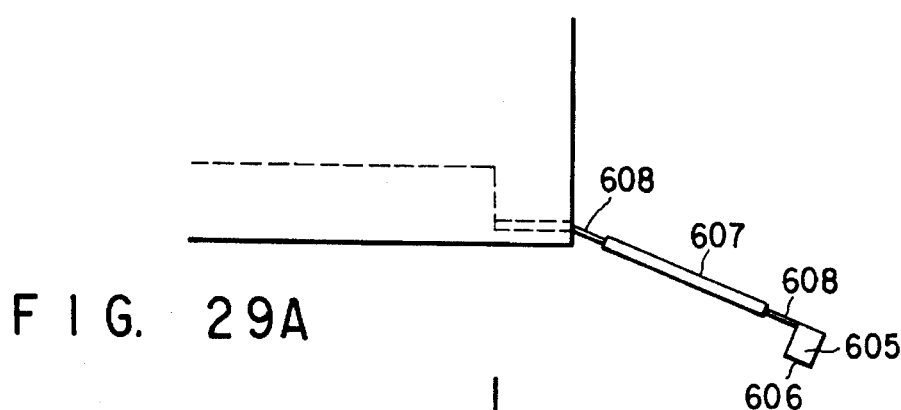
F I G. 29A
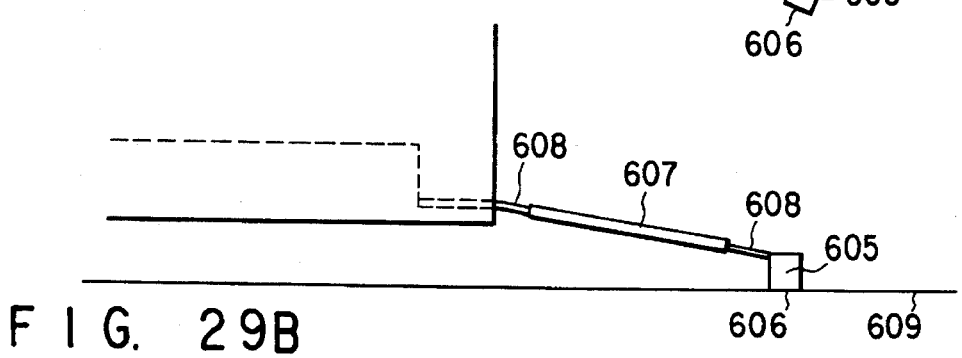
F I G. 29B

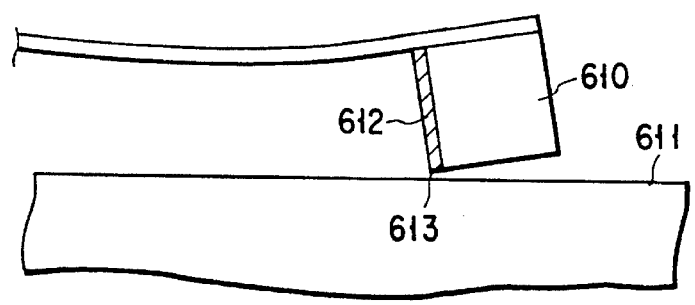
F I G. 30
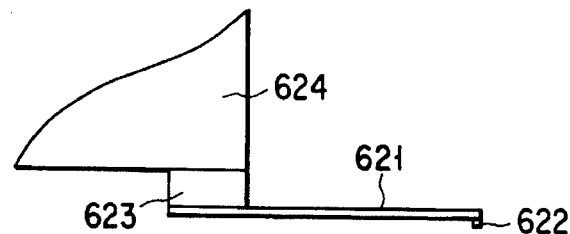
F I G. 31A
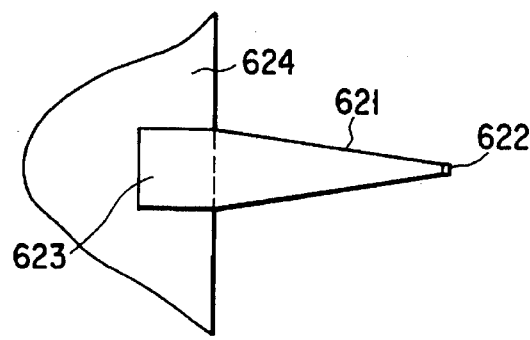
F I G. 31B
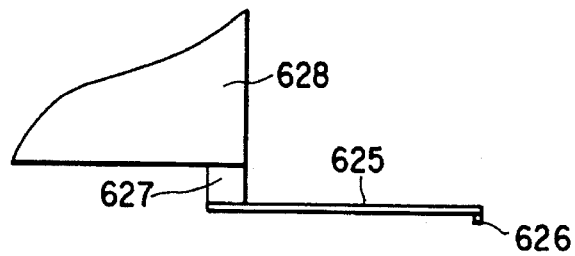
F I G. 32A
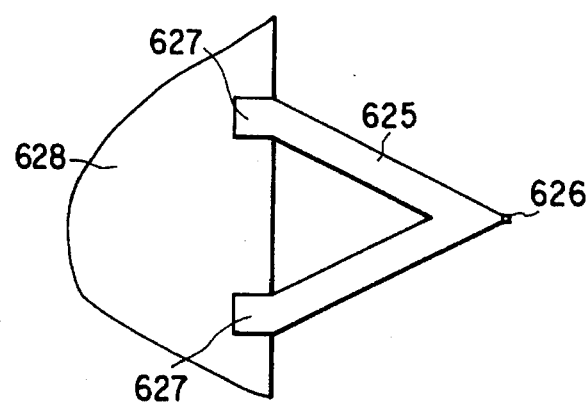
F I G. 32B

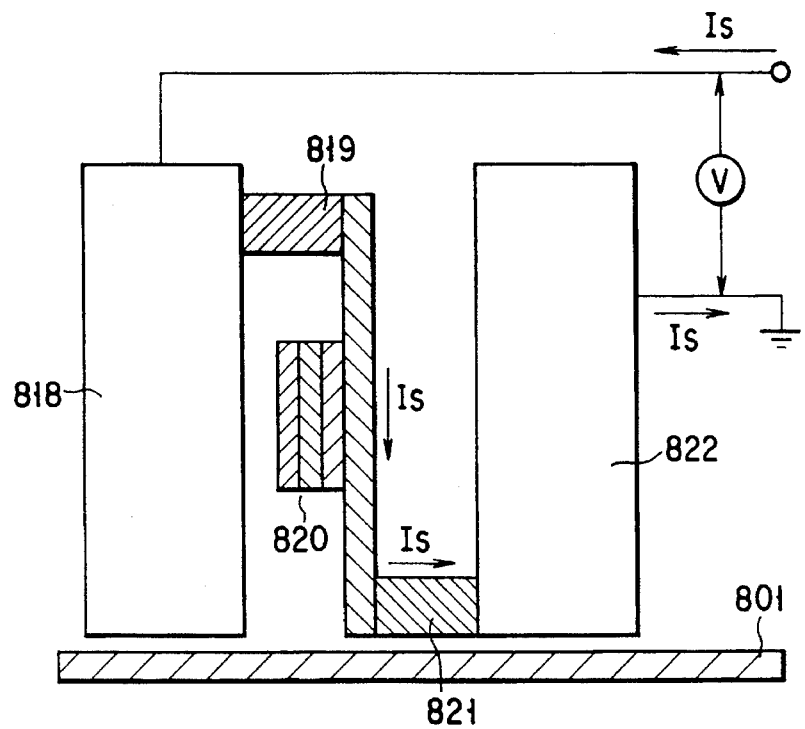
F I G. 44
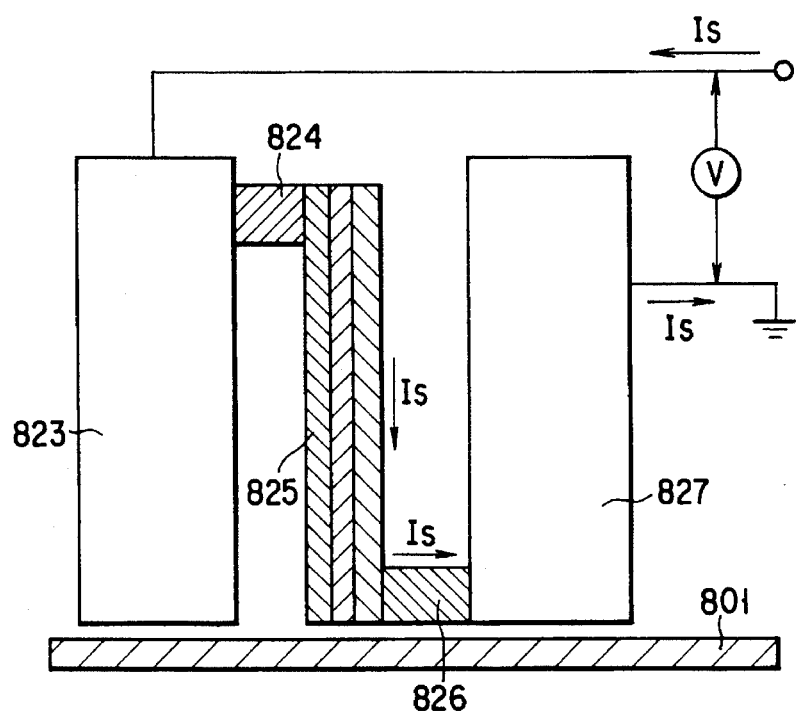
F I G. 45

MAGNETIC DISK MEMORY SYSTEM

BACKGROUND OF THE INVENTION

1. Field of the Invention

The present invention relates to a magnetic disk memory system, and more specifically to a magnetic disk memory system in which a magnetic disk of perpendicular recording type is used.

2. Description of the Related Art

Recently, in the field of computers, magnetic disk memory systems are widely used as randomly accessible auxiliary memory systems having large capacities. As the use of the memory system widens, there is an increasing demand for a larger memory capacity and higher recording density of the magnetic disk memory system.

The magnetic disk memory system includes a plurality of magnetic disks each prepared by forming a magnetic recording layer on a non-magnetic substrate, and arranged one on another around a common rotation shaft. The memory system also includes an arm on which a magnetic head for writing or recording data on these magnetic disks, and reading or reproducing data therefrom, is provided. Further, the memory system has an actuator for aligning the magnetic head to a predetermined location of a magnetic disk.

In conventional magnetic disk memory systems, the magnetic head is set at the location so as not to be brought into direct contact with the surface of the disk which is rotated at high speed during writing or reading of data. Specifically, the magnetic head accesses a given position of the surface of the disk while flying slightly above the surface, and writing or reading of data is carried out with respect to tracks arranged on the disk surface in such a manner as a concentric circle.

With regard to such magnetic disk memory systems as described above, many studies have been done in order to meet the demand for an increase in memory capacity. For example, these studies include the improvement of the linear recording density (that is, recording density in track direction) of a disk, and the increase in track density. Further, recently, the contact recording is intensively studied as a way of raising the recording density. In the contact recording, writing or reading of data is carried out in a low flying state in which the flying height of the magnetic head with respect to the surface of the magnetic disk is rendered extremely low, or in a state in which the magnetic head is brought into substantial contact with the magnetic disk.

Moreover, in 1975, the perpendicular magnetic recording system which utilizes magnetic anisotropy in a direction perpendicular to the disk plane was proposed in order to increase the linear recording density. With this perpendicular magnetic recording system, recording at a remarkably higher density can be performed than a longitudinal magnetic recording system in which magnetic anisotropy in its plane direction is utilized. This is because in the perpendicular magnetic recording system, the demagnetizing field at a magnetization reversal region is very small in principle, thus enabling to narrow the magnetization transition width. In the perpendicular magnetic recording system, a perpendicular magnetic recording head having a strip-shaped soft magnetic thin film, with which a recording magnetic field having better orientation in a perpendicular direction can be obtained, is known to be effective in raising the recording density. Further, a magnetic disk having a double-layered perpendicular magnetic recording medium structure in which a soft magnetic backing layer is provided underneath a perpendicular magnetic anisotropy recording layer, has been proposed for the purpose of enhancing the efficiency of writing and reading in the perpendicular magnetic recording system, as well as achieving a more sharp magnetic reversal. With this magnetic disk, demagnetization field at the tip end of the magnetic head can be reduced by the magnetic interaction between the magnetic head and the soft magnetic backing layer, and therefore a large recording magnetic field can be obtained. Similarly, the demagnetization at the tip end of the head can be reduced also during reproduction of the data, and therefore the effective magnetic permeability can be improved. Consequently, the magnetic flux from the magnetic disk can be efficiently focused on the magnetic head, thereby obtaining a large reproduction signal.

More recently, in the perpendicular magnetic recording system, an active-type magnetic head employing a magnetoresistance element (MR element) serving to increase the sensitivity of the signal reproduction has been proposed. The active-type magnetic head serves to convert a magnetic flux supplied from a recording medium into an electric signal by taking advantage of the property inherent to the MR element, in which the electrical resistance of the MR element made of a soft magnetic material such as permalloy changes due to an external magnetic field. The reproducing sensitivity of a magnetic head using an MR element is proportional to the amount of current (sense current) supplied to the MR element for converting the change in resistance of the MR element into the change in voltage. Therefore, if the relative speed between the magnetic head and a medium is low, a large output can be obtained by increasing the sense current. By using this large output, the track width can be narrowed, and the track density can be increased.

Examples of the magnetic head comprising a built-in MR element, which is designed for use in the perpendicular magnetic recording system, are disclosed in, for example, Jap. Pat. Appln. KOKOKU Publications Nos. 62-24848 and 63-67250. In the magnetic heads disclosed in these documents, the MR element is located adjacent to the single-pole film used for recording, and disposed to face a recording medium.

However, in the case of these magnetic heads, the MR element contact with the medium causes it to be abraded. Consequently, the cross section of the MR element decreases, and accordingly the resistance of the element increases. As a result, the produced output is varied.

Jap. Pat. Appln. KOKOKU Publication No. 53-25488 provides a structure for avoiding the abrasion of an MR element, and discloses a magnetic head comprising two soft magnetic yokes arranged in contact with a medium and the MR element disposed in a bridge manner in parallel with the yokes. In such a magnetic head, the MR element is not abraded since it is never brought into contact with the surface of a medium. However, the direction of the magnetic field generated during recording is in parallel with that of the film surface of the MR element. Therefore, a large recording magnetic field is applied in the direction of the film surface of the MR element during recording, thereby disturbing the magnetic domain structure of the MR element. In addition, this magnetic head is not applicable to the perpendicular magnetic recording system because this magnetic head serves as a ring-type head during recording, thus generating a large magnetic field in the longitudinal direction.

The influence of the recording magnetic field on an MR element can be removed by arranging the recording head and the reproducing MR element apart from each other. However, in this case, a distance between the recording head and reproducing head is likely to create a track error, thus remarkably deteriorating the quality of signals. Such a problem is more likely to occur particularly in a track of a small diameter.

On the other hand, in a magnetic head in which the MR element is placed adjacent to the recording single-pole film and the magnetic shield film, the MR element and these soft magnetic films (single-pole film and magnetic shield film) are magnetically coupled during reproduction of signals. When the distance between the MR element and these soft magnetic films is designated by g and the film thickness of the MR element is designated by Tm, the resolution of the magnetic head is limited by the sum of these values (g+Tm). As a result, despite that a magnetic recording layer of a perpendicular magnetic anisotropy is used, a high reproducing resolution equivalent to a good recording resolution of that magnetic recording layer is not likely to be obtained.

Moreover, in order to obtain a large reproduction signal, a thin MR element having a thickness of 0.1 μm or less, preferably 0.05 μm or less, should be used since the resistance value of the MR element must be increased. In this case, the film thickness of the MR element will be substantially the same as the grain diameter of crystals constituting the magnetic recording layer of the perpendicular magnetic anisotropy. As a result, not only the resolution cannot be increased to a sufficient level, but also the noise due to the grain diameter of the crystals is increased, thereby lowering the signal quality.

In the above-described magnetic disk memory system, as shown in FIG. 1, a head slider formed by mounting a magnetic head 539 in a part of a slider 538 is used. The head slider is arranged so that air-bearing surfaces 540 consisting of two parallel planes face the surface of a magnetic disk, and a gap portion 541 of the magnetic head 539 is so located as to face the magnetic disk surface for recording and reproduction of a signal.

FIG. 2 is a conceptual diagram illustrating the operation principle of the head slider. A slider 542 is supported and restrained on a supporting point 543 under the condition that a force (indicated by arrow 544) perpendicular to the surface of a disk is imposed and a moment (indicated by arrow 545) around the supporting point is imposed by means of a gimbal spring and a suspension spring. A magnetic head 546 is provided on the rear end of the slider. A gap 547 is located at the rear end of an air bearing surface 548 of the slider such as to face the surface of a magnetic disk 550 which rotates in the direction indicated by arrow 549. This head slider mechanism is also employed in the present invention, and details thereof will be described later. As regards the structure in which such a head slider is connected to an actuator, see FIG. 20 and the description concerning the figure, later provided. The embodiment shown in FIG. 20 is similar to the conventional art.

Referring to FIG. 2, when the magnetic disk 550 rotates, the surrounding air moves along with the disk due to the viscosity of air itself, generating an air flow. This air flow creates a hydrodynamic pressure between the air bearing surface 548 and the surface of the magnetic disk 550. The head slider 542 flies above the disk with a constant clearance 551 therebetween where the hydrodynamic pressure and the supporting constraint force of the gimbal and suspension springs are balanced with each other.

In this mechanism, the magnetic head 546 is not brought into contact with the magnetic disk 550, and therefore the abrasion of the head and disk, caused by the contact therebetween, can be prevented. However, from a view point of magnetic recording, because of the clearance gap 551 between the magnetic head and the magnetic disk, a read and write spacing loss is created, thus lowering the output of signals. This problem is particularly prominent in the case where the recording density is high and the wavelength of a recording signal is short, or in the perpendicular magnetic recording system in which the easy axis of magnetization is perpendicular to the disk surface. Therefore, this problem blocks the increasing in recording density.

In order to overcome this problem, there has been proposed a recording/reproducing system in which the clearance gap between the magnetic head and the magnetic disk is made so small that they are substantially in contact with each other. For example, Jap. Pat. Appln. KOKAI Publication No. 3-178017 discloses a method in which a magnetic head is shaped into a stylus, and the recording/reproducing portion of the tip end of the magnetic head is pressed on the disk with an extremely light load. This publication states that the amount of abrasion of a head, caused by sliding of the head on a disk, can be suppressed in a practically acceptable range by means of imposing extremely light load on a extremely minute area. However, it is not easy to stably apply a constant and extremely light load on the stylus head.

As a method of stably reducing the distance between a magnetic head and a magnetic disk, there is proposed, for example, in Jap. Pat. Appln. KOKAI Publication NO. 62-3476, a method in which a large and a small flying sliders are coupled, and a magnetic head is mounted in the small slider. However, with this method, the small slider also flies, and therefore the gap between the magnetic head and the magnetic disk can only be reduced to a limited level. Consequently, it is difficult to bring the magnetic head and the magnetic disk into contact with each other.

SUMMARY OF THE INVENTION

The first object of the present invention is to provide a magnetic disk memory system of a perpendicular recording type comprising a magnetic head having an MR element, in which the abrasion of the MR element, as well as the disturbance of the magnetic domain structure of the MR element due to a recording magnetic field can be prevented.

The second object of the present invention is to provide a magnetic disk memory system in which the magnetic coupling of a recording magnetic pole and a reproducing MR element with a magnetic disk can be intensified, and both recording resolution and reproducing resolution can be enhanced.

The third object of the present invention is to provide a magnetic disk memory system in which a slider on which a magnetic head is mounted can be pressed on a magnetic disk with a stable very light load, thereby enabling the system to carry out recording and reproducing of a signal while the magnetic head and the disk being in contact with each other.

The fourth object of the present invention is to provide a magnetic disk memory system in which the angle of the sliding surface of a slider on which a magnetic head is mounted, with respect to the surface of a magnetic disk, can be constantly maintained at a predetermined value.

The first object of the present invention can be achieved by a magnetic disk memory system comprising:

a magnetic disk of a perpendicular recording type, including a soft magnetic backing layer and a magnetic recording layer of a perpendicular magnetic anisotropy formed on the backing layer; and a magnetic head for writing and reading data with respect to the magnetic disk;

wherein the magnetic head comprises:
- (a) a pair of main magnetic poles each of which is made of a material having a high magnetic permeability, one end of the each pole being located so as to face the magnetic disk surface;
- (b) a non-magnetic interlayer provided between two main magnetic poles of the pair;
- (c) a recording coil disposed so as to generate a magnetic flux passing through the magnetic disk via the main magnetic poles; and
- (d) an MR element provided via an insulation layer on the other ends of the pair of main magnetic poles, the MR element having a film surface parallel to end surfaces of the other ends of the main magnetic poles, and being magnetically coupled with the pair of main magnetic poles.

In the magnetic disk memory system according to the first object, a pair of relatively thick main magnetic poles serve to perform a perpendicular recording at a high sensitivity, during recording of a signal. During reproduction of the signal, the pair of main magnetic poles between which a non-magnetic interlayer is disposed, operates as a differential type head. Since the reproducing resolution of the head is determined by the thickness of the non-magnetic interlayer, high resolution can be obtained. Further, the MR element, which is used for reproduction of a signal, is provided via an insulation layer for the other ends (which is located opposite side to magnetic disk) of the main magnetic poles. With such a structure, even if the magnetic head is run in contact with a magnetic disk, abrasion of the MR element does not occur. Also, even if the magnetic disk is conductive, leakage of the sense current flowing in the MR element does not occur.

In additions, since the end faces of the main magnetic poles and the film surface of the MR element are in parallel to each other, the direction of the recording magnetic field passing through the main magnetic poles coincides with the direction perpendicular to the film surface of the MR element. Consequently, a large demagnetization field is created in the MR element towards the direction in which the external magnetic field (recording magnetic field) is canceled. Therefore, even if a very large recording magnetic field is applied to the MR element, the magnetic domain structure thereof cannot be disturbed.

The second object of the present invention can be achieved by a magnetic disk memory system comprising:

a magnetic disk of a perpendicular recording type, including a soft magnetic backing layer and a magnetic recording layer of a perpendicular magnetic anisotropy formed on the backing layer; and a magnetic head for writing and reading of data with respect to the magnetic disk;

wherein
- (a) the magnetic head comprises a soft magnetic film for recording or a soft magnetic film for magnetic shield, and an MR element for reproducing which is located close to the soft magnetic films, the soft magnetic film and the MR element being disposed in such a way that the tip ends thereof face the surface of the magnetic disk;
- (b) a following relationship is satisfied, $Tm<\lambda\ min<Tm+g;$ where Tm represents a film thickness of the MR element, g represents a distance between the MR element and the soft magnetic film, and λ min represents a minimum recording wavelength; and
- (c) An average diameter of magnetic crystalline grains constituting the magnetic recording layer of the magnetic disk is smaller than the film thickness Tm of the MR element.

In the magnetic disk memory system according to the second object, it is rendered possible to reproduce a signal at a resolution higher than the reproducing resolution (Tm+g) of a conventional shield type MR head, when the distance between the tip end of the MR element and the magnetic recording layer is set within a given range. In the case where a magnetic disk having a protective layer on a magnetic recording layer, the distance between the tip end of the MR element and the magnetic recording layer will be the sum of the distance (ds) between the tip end of the MR element and the surface of the recording medium, and the film thickness (dp) of the protective layer. In this case, the total distance (ds+dp) should be set such as to satisfy the relationship below in order to obtain the above-described effect of the invention;

$ds+dp<Tm;$ and $ds+dp+dr<2Tm,$ where dr represents the film thickness of the magnetic recording layer.

A detailed description of this point will be provided later in Example 3.

Further, when the MR element and the soft magnetic backing layer are arranged close to each other so that a magnetostatic coupling is established therebetween, a high resolution reproduction in which its resolution is equivalent to the film thickness (Tm) of the MR element, can be achieved. For this reason, when the above condition is satisfied, the loss caused by the gap with a conventional shield-type MR head, which was represented by the $\sin(k(Tm+g))/k(Tm+g)$, can be reduced to $\sin(kTm)/kTm$.

Further, since the average diameter of the magnetic crystalline grains of the magnetic recording layer is smaller than the thickness Tm of the MR element, the following advantage can be obtained. That is, even if the resolution is enhanced to a fully high level, the noise due to the grain diameter of the crystals can be suppressed, thus providing a good signal quality.

The third object of the present invention can be achieved by a magnetic disk memory system comprising:

a magnetic disk;

a magnetic head for writing or reading data with respect to the magnetic disk; and a flying slider for supporting the magnetic head, the slider flying at a height where a hydrodynamic force due to an action of air flow caused by rotation of the magnetic disk are balanced with a press-down load externally applied;

wherein
- (a) further comprising a contact slider connected to the flying slider via a support member having a spring property, the slider being disposed so as to contact with the surface of the magnetic disk;
- (b) the magnetic head is mounted on the contact slider so as to be brought into contact with the surface of the magnetic disk;
- (c) the contact slider is brought into contact with the surface of the disk by means of a spring force of the support member while the flying slider is flying above the surface of the disk; and (d) most of the press-down load externally applied on the flying slider is canceled by the hydrodynamic force of the flying slider, and the rest of the load is applied on the contact slider, while the flying slider is flying.

In the magnetic disk memory system according to the third object, a flying slider is supported by a gimbal spring, a suspension spring or the like. The flying slider flies above a magnetic disk while autonomously maintaining the gap between the surface of the disk and the slider itself at constant by balancing the hydrodynamic pressure of the air flow and the external press-down force with each other. The support member used for connecting the flying slider and the contact slider to each other, has a function as a plate spring, and the contact slider is pressed on the surface of the magnetic disk by means of the recovering force of this plate spring. Consequently, the contact slider is in contact with the surface of the magnetic disk even when the flying slider is flying, and naturally, the magnetic head is in contact with the surface of the disk at all times.

The flying slider flies above a magnetic disk while autonomously maintaining the distance therefrom at constant, and accordingly, the force applied to press the magnetic head on the surface of the disk can be autonomously maintained at constant only by means of the plate spring function of the support member. Hence, no adjustment is required. Further, the flying slider can accurately follow the fluctuation of the surface of a magnetic disk. In other words, even in the case where the surface of a magnetic disk fluctuates, the height at which the flying slider flies with respect to the surface is kept at constant, and therefore the press-down force of the contact slider (or magnetic head) with respect to the surface of the magnetic disk can be maintained constant.

In general, the flying height of a flying slider is stable, and its variance is only about 10% of the total flying height even when an external disturbance is applied. For example, when the total flying height is 0.2 μm, the variance is 0.02 μm. Supposing that the spring constant of a support member used for joining a contact slider on a flying slider is 0.5 mg/μm, even if the flying height of the flying slider varies in the above range, the variance of the press-down force of the support member is sufficiently small, i.e. 0.01 mg. Therefore, the variance of the press-down force of the magnetic head with respect to the surface of a disk is, in a practical sense, negligible. It should be noted that when the press-down force of the magnetic head is 50 mg and the spring constant of the supporting member is 0.5 mg/μm, the amount of projection of a magnetic head from the surface of an air bearing (for example, numeral 508 in FIG. 19) is designed to be 100 μm.

The fourth object of the present invention can be achieved by a magnetic disk memory system comprising:

a magnetic disk;

a magnetic head for writing or reading data with respect to the magnetic disk;

a contact slider on which the magnetic head is mounted; and a support member, having a spring property, for joining the contact slider to an appropriate fixation end of an aligning mechanism for the magnetic head;

wherein (a) the support member has a returned beam structure including a first beam extending from the fixation end in one direction and a second beam extending from a distal end of the first beam in a direction opposite to that of the first beam; and (b) recording and reproduction of data with respect to the magnetic disk are performed while the magnetic head and the slider are in contact with the surface of the magnetic disk.

In the magnetic disk memory system according to the fourth object, the appropriate fixation end of the aligning mechanism for the magnetic head also includes the flying slider explained in connection with the magnetic disk memory system according to the third object.

In the magnetic disk memory system, the angle of a contact surface of the slider with respect to the surface of the magnetic disk can be constantly kept at a given value by selecting appropriate length and rigidity of the first beam (from the proximal end of the support member to the turning point) and appropriate length and rigidity of the second beam (from the turning point to the distal end), even in the case where the distance between the fixation end of the support member and the surface of the magnetic disk varies. Therefore, stable recording/reproduction characteristics can be achieved.

In the present invention described above, it is preferable that the film thickness (db) of the soft magnetic backing layer of a magnetic disk, its saturation magnetic flux density (Bsb), the film thickness of the magnetic recording layer, and its saturation magnetization (Isr) satisfy the following relationship;

$Bsb.db > Isr.dr.$

When this relationship is satisfied, the soft magnetic backing layer is not easily saturated, thereby making it possible to strengthen the magnetostatic coupling between the magnetic head and the magnetic disk.

Further, it is also preferable for the present invention that the system comprise means for forming a signal-free region where no substantially effective signals are present, between each adjacent recording tracks on a magnetic disk. When such a signal-free region is provided between adjacent recording tracks, recording or writing error, i.e. data is not completely rewritten or deleted in a boundary region between adjacent tracks, which occurs during erasing or rewriting data, can be prevented. In order to achieve this, the signal-free region should be formed to satisfy the following relationship;

$G > Tp - Tw,$ where Tw represents the width of each of the recording tracks on a magnetic disk, Tp represents the track pitch of the recording tracks, and G represents the width of the signal-free regions.

Such a signal-free region can be formed by utilizing, for example, the side fringe magnetic field of a magnetic head. More specifically, in the case of a ring-type recording head having a magnetic gap, the signal-free region can be formed by satisfying the following two conditions;

$g < (1500/Hc - Hc/4000\pi + 0.3)/(Hc/400\pi - \frac{1}{2}),$ and $g \geq (1500/Hc - Hc/4000\pi + 0.3 - Tp + Tw)/(Hc/400\pi - \frac{1}{2}),$ where g [μm] represents the gap size of the magnetic gap, Tw [μm] represents the recording track width, Tp [μm] represents the track pitch, and Hc [Oe] represents the coercivity of the magnetic layer of the magnetic disk.

In the case of a perpendicular magnetic recording single-pole head in which at least one of the side faces (end faces in a track width direction) of the main pole is tapered in such a manner that the width (in a track width direction) of the main pole becomes narrower from leading end to trailing end, the signal-free region can be formed by satisfying the following condition;

$$0<p\leq Tp-Tw,$$

where p represents a tapering size of the tapered side face along the track width direction, Tw represents the track width, and Tp represents the track pitch.

Further, the signal-free region can be formed by designing factors of the magnetic disk itself only. More specifically, the formation of the signal-free region can be achieved by rendering, in the signal-free region, at least one of the saturation magnetization and the coercivity of the magnetic recording layer, smaller than that in the recording track region.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a diagram showing a schematic view, including a partial cross section, of a magnetic disk memory system according to the first embodiment of the present invention;

FIG. 5 is a diagram showing a schematic perspective view of the magnetic head mounted on the system shown in FIG. 3;

FIG. 12 illustrates the waveform of a reproduction signal formed by the magnetic head shown in FIG. 5 when the thickness of the main poles is increased;

FIG. 14 is a diagram showing a cross section of a main portion of the magnetic disk memory system according to the second embodiment of the present invention;

FIGS. 21 to 23 each illustrates examples of the method of manufacturing a contact slider on which a magnetic head is mounted;

FIG. 24 is a side view showing another example of the combination of a flying slider, a contact slider, and a magnetic head;

FIG. 27 is a diagram showing a conceptual view illustrating the state in which the contact slider connected at the distal end of the supporting member is in contact with the surface of a disk;

FIGS. 28A and 28B are diagrams illustrating a method of improving the state in which the contact slider is in contact with the surface of a disk, and the effect thereof;

FIGS. 29A and 29B are diagrams illustrating another method of improving the state in which the contact slider is in contact with the surface of a disk, and the effect thereof;

FIG. 30 is a diagram illustrating different method for improving the state in which the magnetic head mounted on the contact slider is in contact with the surface of a disk;

FIG. 31A is a diagram showing a side view of another example of the support member used for joining the contact slider on which the magnetic head is mounted, to the flying slider, and FIG. 31B is a plan view thereof;

FIG. 32A is a diagram showing a side view of still another example of the support member, and FIG. 32B is a plan view thereof;

FIG. 44 is a diagram showing the fourth example of the path for supplying a sense current to the MR element;

FIG. 45 is a diagram showing the fifth example of the path for supplying a sense current to the MR element;

DETAILED DESCRIPTION OF THE PREFERRED EMBODIMENTS

Figure 1:
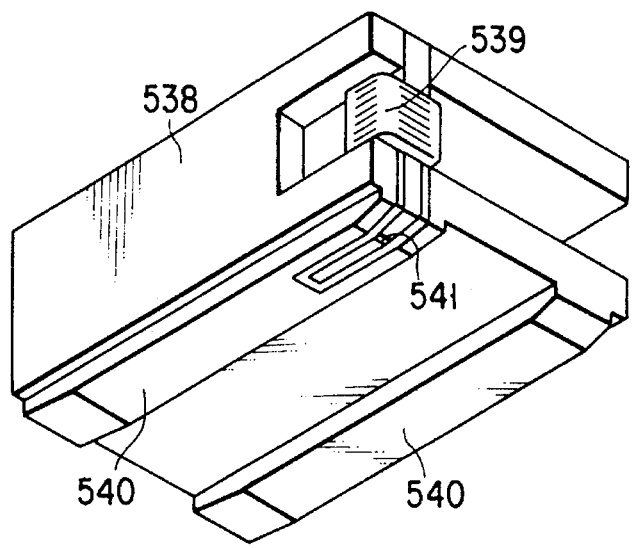
FIG. 1 is a diagram showing a schematic view of a conventional flying slider on which a magnetic head is mounted.
Figure 2:
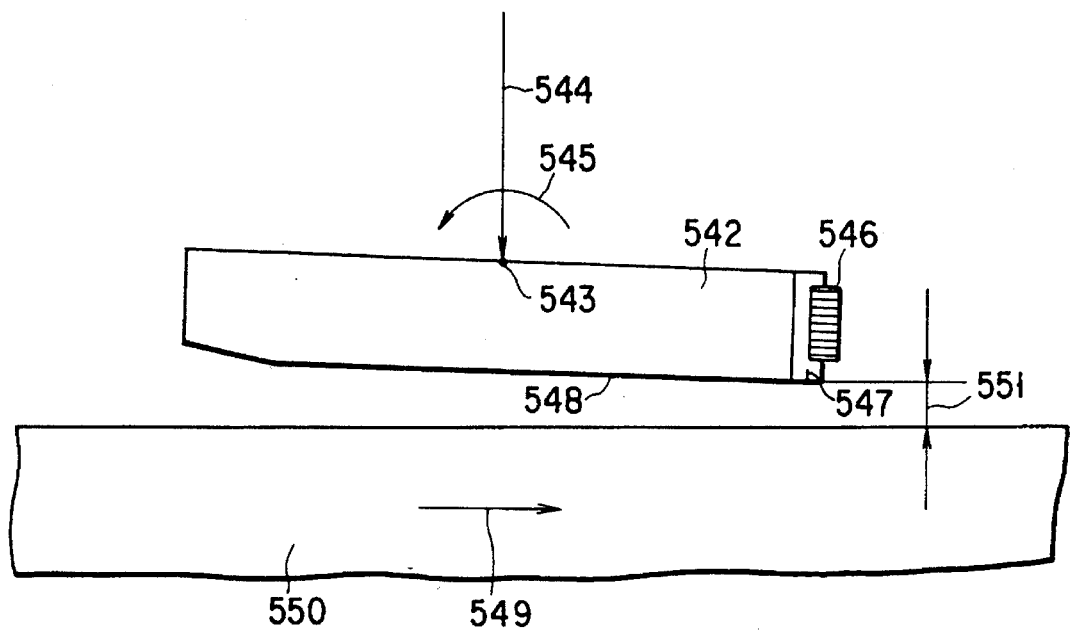
FIG. 2 is a diagram designed to illustrate the principle by which the flying slider flies.

Embodiments of the present invention will now be explained below, with reference to drawings.

Embodiment 1

FIG. 3 is a perspective view showing a main part of a magnetic disk memory system according to the present invention, with a part of a magnetic disk being cut away.

This magnetic disk system comprises a magnetic head 101 and a magnetic disk 102 of a perpendicular magnetic recording type.

Magnetic head 101 is provided in such a manner that the head 101 has a contact with a magnetic disk 102 by an arm 103. This magnetic head 101 is positioned on a desired track 104 among a plurality of tracks coaxially formed on the magnetic disk 102, by an actuator not shown in the figures.

The magnetic disk 102 has a structure in which a soft magnetic backing layer 106 and a magnetic recording layer 107 of a perpendicular anisotropy are formed in this order, on a disk-like substrate 105 of a non-magnetic material formed to have a disk-like shape, and a protective film 108 is formed on the magnetic recording layer 107. As a specific example thereof, a soft magnetic backing layer 106 having a thickness of 0.1 µm and made of CoZrNb microcrystalline was formed on a glass substrate having a diameter of 1.8 inches and a thickness of 0.4 mm, by using a high frequency sputtering in an argon gas atmosphere. This soft magnetic backing layer 106 had a longitudinal coercivity (Hcs) of 10 Oe. Further, a magnetic recording layer 107 of a perpendicular magnetic anisotropy having a thickness of 0.08 µm and made of CoPt was formed on the backing layer, by a DC magnetron sputtering in an argon gas atmosphere. This magnetic recording layer 107 had a perpendicular coercivity (Hch) of 2200 Oe. A protective film 108 made of diamond-like carbon and having a thickness of 0.008 µm was formed on the magnetic recording layer 107, to ensure a durability against its contact with the head. Thus, the magnetic disk 102 was prepared.

The structure of the magnetic head 101 will be explained below.

Figure 4:
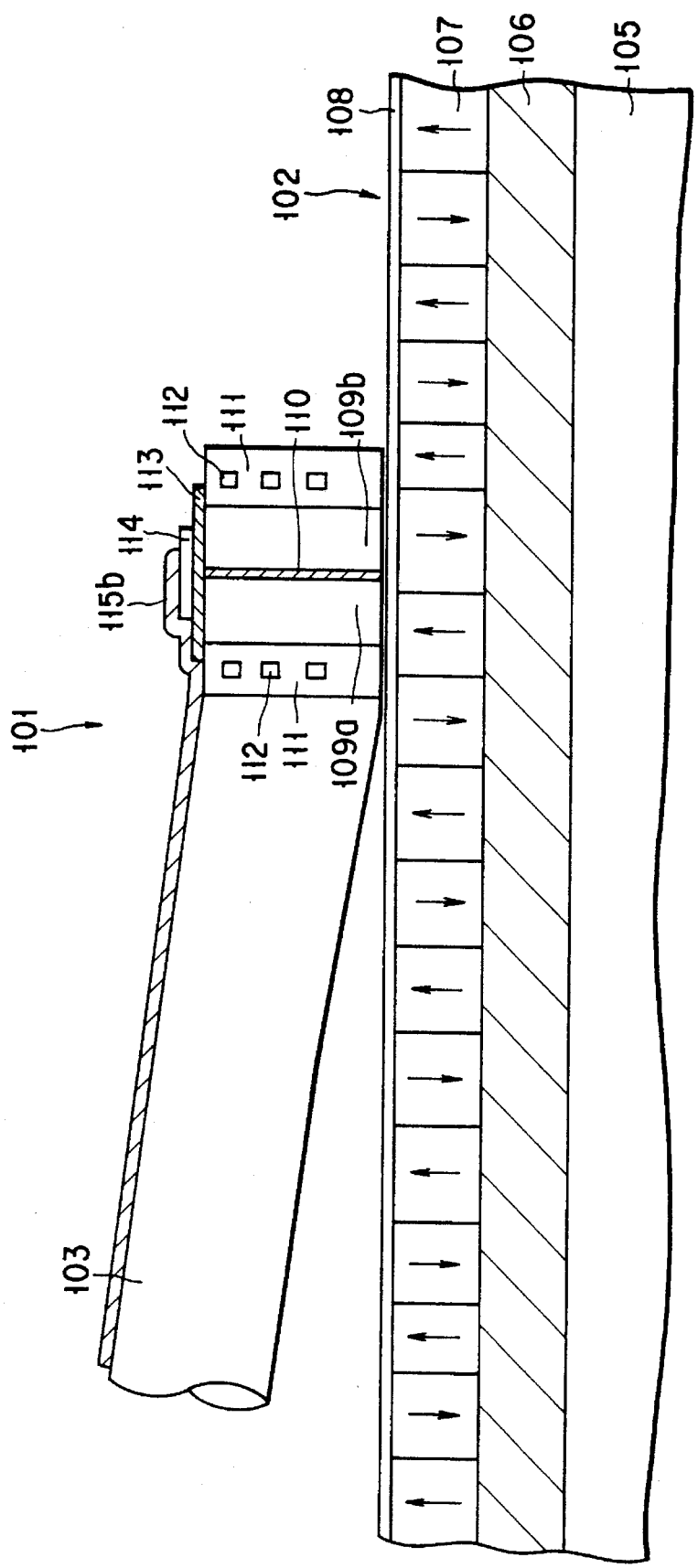
FIG. 4 is a diagram showing a cross section of a main portion of the system shown in FIG. 3.

FIG. 4 is a schematic cross sectional view showing the magnetic head 101 cut along a direction in which the magnetic head 101 and the magnetic head 102 move relatively to each other. FIG. 5 is a perspective view showing a part of the magnetic head 101.

In these figures, the reference numeral 103 denotes a needle-like arm made of ceramics. Main magnetic poles 109a and 109b made of a CoFe high magnetic permeability material are formed at an tip portion of the needle-like arm 103, by a high frequency sputtering. These magnetic poles 109a and 109b are provided so as to extend in a direction perpendicular to the surface of the magnetic disk 102 and are formed by a two-layered structure consisting of two layers facing each other in a track direction. In addition, the main magnetic poles 109a and 109b are provided in such a manner that one end (front end) of each pole are facing to the magnetic disk 102. The main poles 109a and 109b are 0.3 µm thick in the track direction, and a non-magnetic interlayer 110 having a thickness of 0.01 µm and formed of Ti by a high frequency sputtering is inserted between these poles. A recording coil 112 covered with an insulating material 111 is provided around the main magnetic poles 109a and 109b. In this example, a recording coil 112 has three turns.

The other end of each of the main poles 109a and 109b, i.e., a rear end positioned opposite to the front end facing the magnetic disk 102 is provided with an MR element 114 made of permalloy with an insulation layer 113 interposed therebetween. The MR element 114 is positioned in such a way that a film surface of the element is in parallel with the surface of the magnetic disk 102, and is magnetically coupled with the main poles 109a and 109b. Both end portions of the MR element 114 in the track width direction are connected with two copper lead lines 115a and 115b, so that a sense current Is in the track-width direction can flow through the MR element 114 via these copper leads 115a and 115b. Recording and reproduction are carried out with the head 101 and the magnetic disk 102 being kept in contact with each other.

When recording is carried out, a recording current corresponding to a signal is made flow through the recording coil 112, thereby to generate a strong magnetic flux passing through the main magnetic poles 109a and 109b in a direction corresponding to the recording signal. In this state, a magnetostatic coupling of the main magnet poles 109a and 109b with the soft magnetic layer 106 of the magnetic disk incurs a recording magnetic field having a large and sharp distribution inside the magnetic recording layer 107 inserted between the poles and the layer 106. Due to this recording magnetic field, the magnetic recording layer 107 is magnetized in the direction corresponding to the signal.

Figure 6:
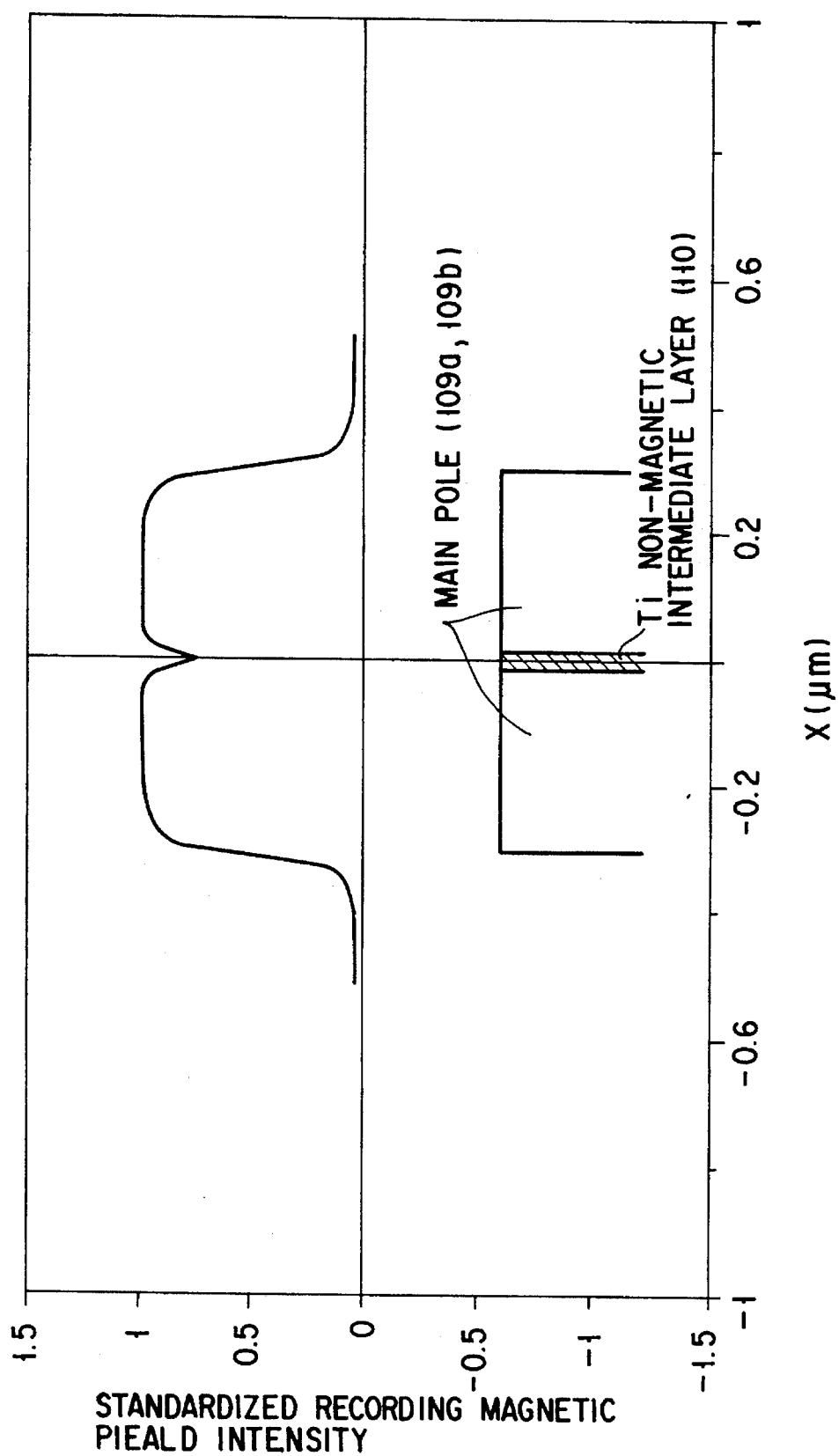
FIG. 6 is a graph illustrating the distribution of the recording magnetic field generated by the magnetic head shown in FIG. 5.

FIG. 6 shows a distribution of a recording magnetic field at a position apart from the front end surface of the head by 0.01 μm. Even when the front ends (i.e., the lower ends in the figure) of the main magnetic poles 109a and 109b are brought into contact with the protective film 108 of the magnetic disk 102, an average clearance of approximately 0.002 μm exists between the front ends and the protective film 108 due to a surface roughness. Further, the protective film 108 has a thickness of 0.008 μm. Therefore, a distance between the front ends and the magnetic recording layer 107 of the magnetic disk 102, i.e., a spacing (d) between a head and a recording layer is 0.01 μm.

When the signal is reproduced, a magnetization reversal point of the magnetic disk 102 passes through the front ends of the main magnetic poles 109a and 109b, thereby changing magnetic flux density which flows from one of the main magnetic poles to the other through the MR element 114. This change in the magnetic flux incurs a rapid change in the electric resistance of the MR element 114.

Figure 7:
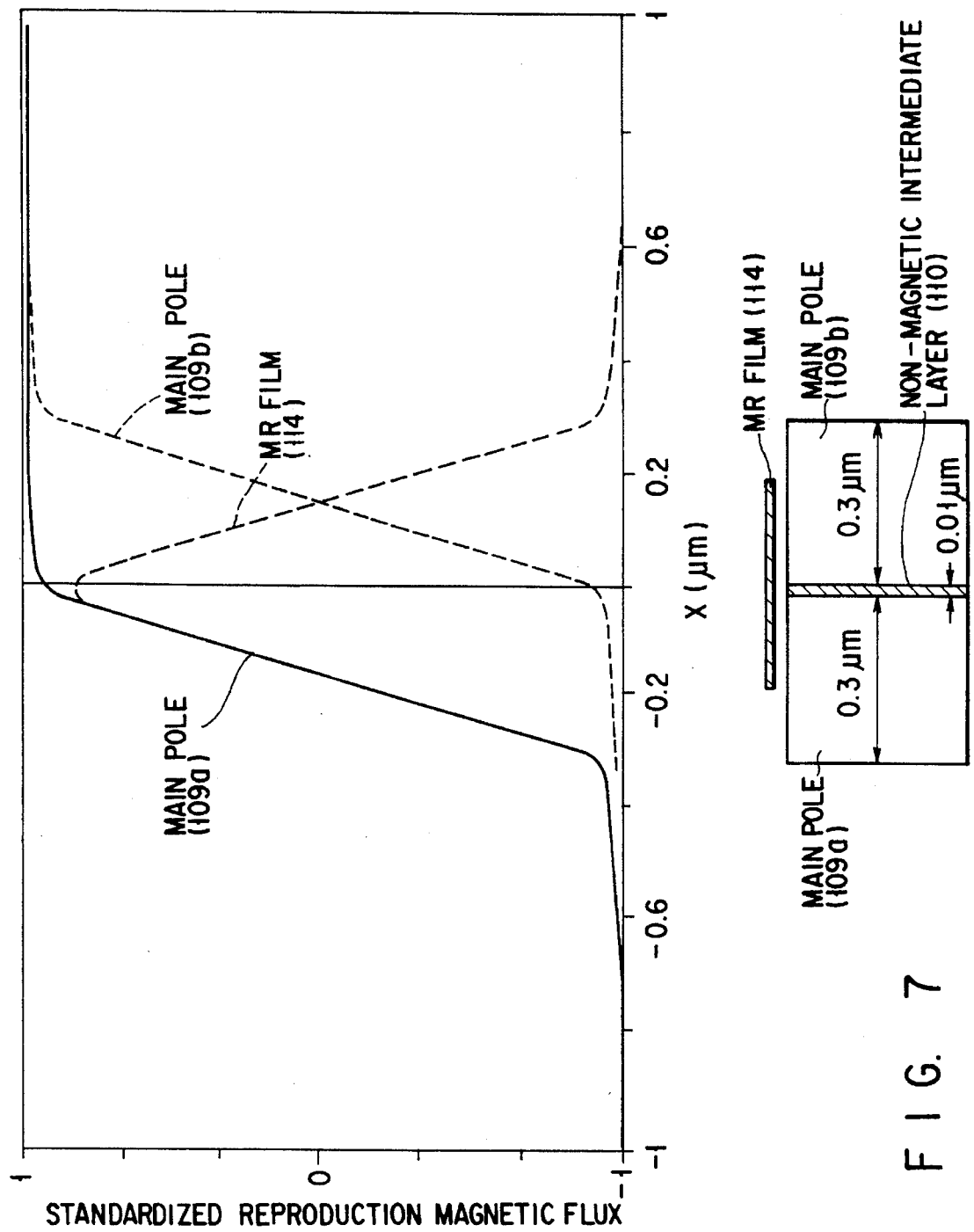
FIG. 7 is a graph illustrating a change in magnetic flux within the MR element of the magnetic head shown in FIG. 5 during reproduction cycle.

FIG. 7 shows a change in magnetic fluxes density which flows inside the MR element 114 when the signal is reproduced. When magnetization reversal point comes close to the front ends of the main magnetic poles 109a and 109b, a magnetic flux density passing through each of main magnetic poles starts to increase to a predetermined value. In this state, since there is a constant distance between the main magnetic poles 109a and 109b, the magnetic flux density flowing through each of the poles starts to increase at different time points. As a result, the difference in the magnetic flux density between the fluxes flowing through the main magnetic poles 109a and 109b is largest when the magnetic reversal point comes to the front end of the non-magnetic interlayer 110. The magnetic flux density passing through the MR element 114 is equal to the difference in the magnetic flux density between the two main magnetic poles 109a and 109b. Therefore, the magnetic flux density flowing inside the MR element is largest at the time when the magnetization reversal point comes to the front end of the non-magnetic interlayer 110. Since the resistance of the MR element 114 changes depending on the magnetic flux flowing inside the element, the largest reproduction signal voltage can be obtained at the time when the magnetic flux density passing through the MR element is maximum, only by supplying a constant sense current Is which flows through the MR element 114.

Figure 8:
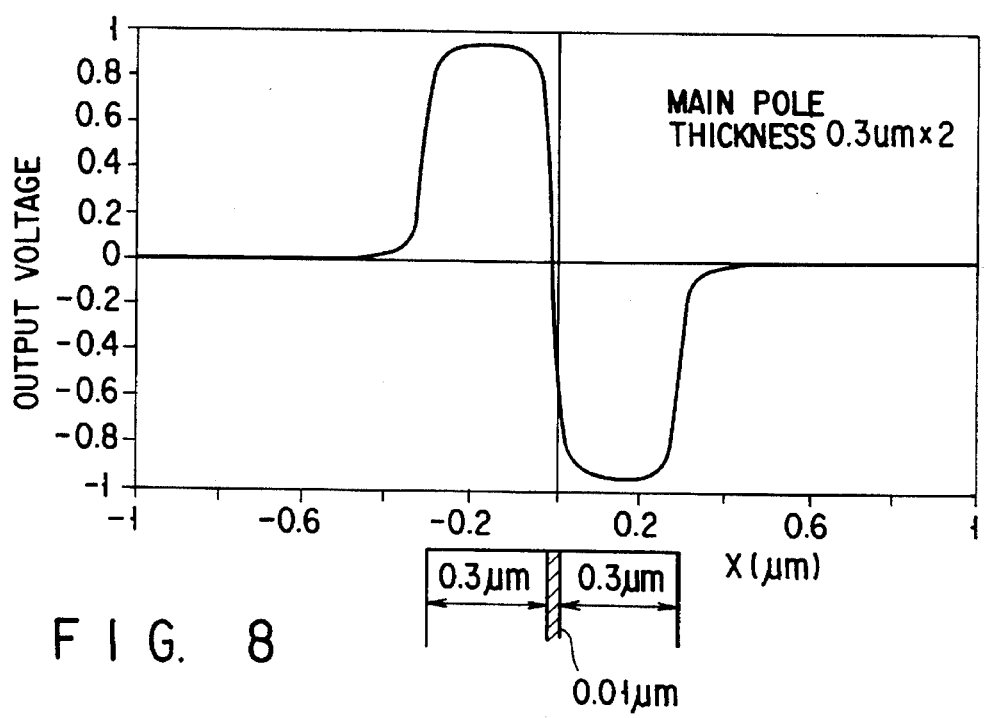
FIGS. 8 to 10 each illustrate the waveform of a reproduction signal formed by the magnetic head shown in FIG. 5.
Figure 9:
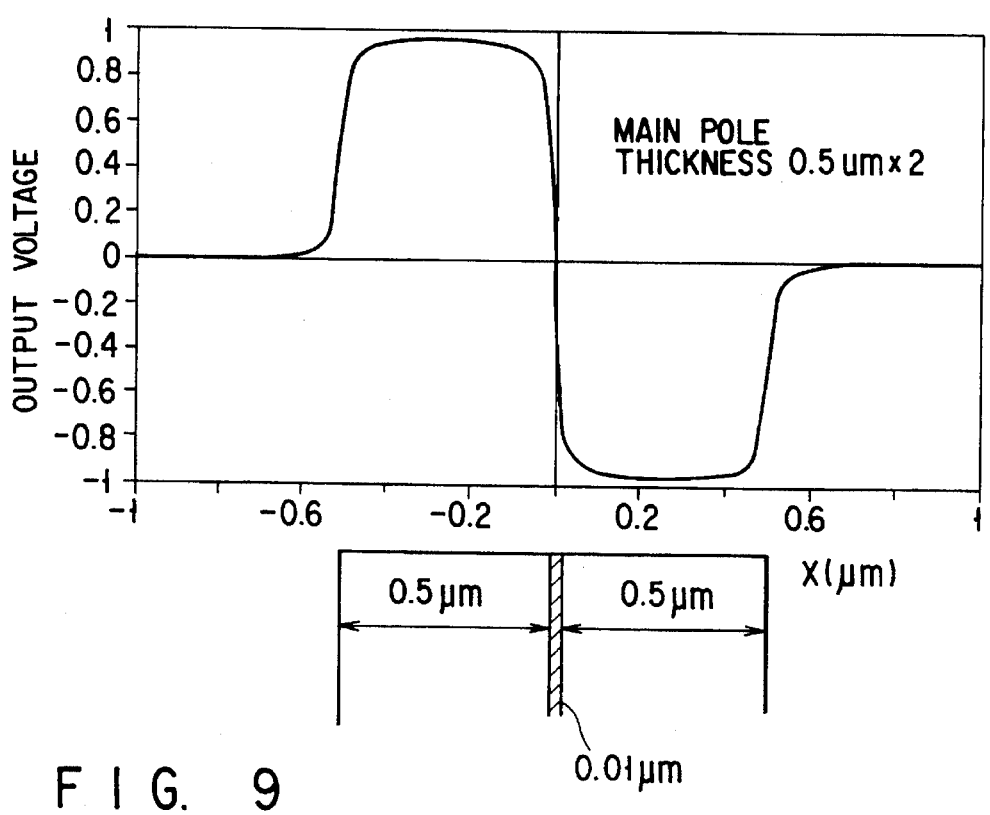
Figure 10:
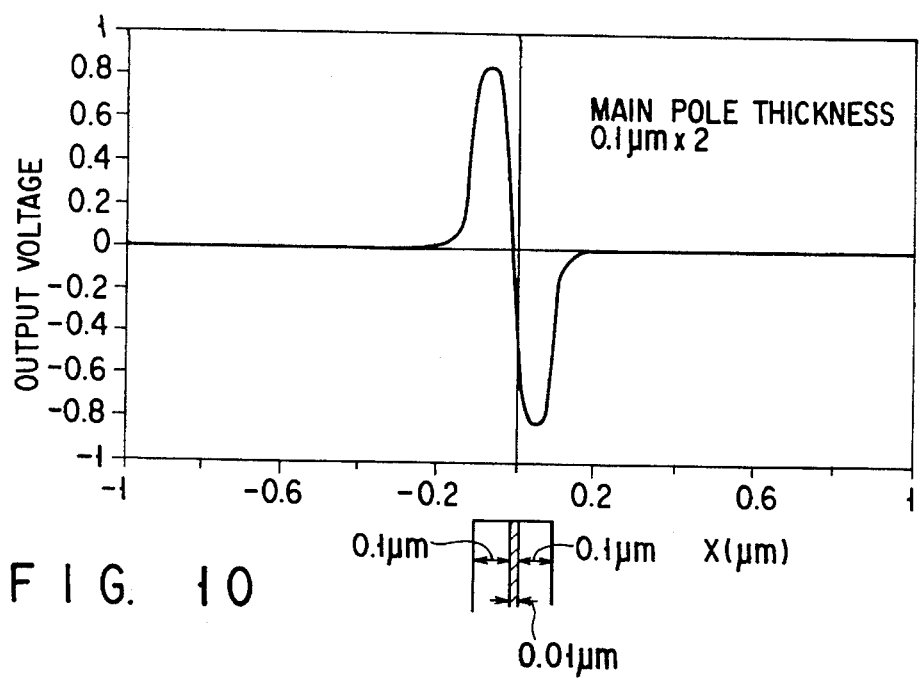

FIGS. 8, 9, and 10 show reproduction signal waveforms differentiated for detecting data. Data is detected at the zero-cross points of the reproduction waveforms. The greater the inclination of the waveform at the zero-cross point is, the better the S/N ratio is. FIGS. 8 to 10 respectively show differential reproduction signals where the thickness of the main magnetic poles 109a and 109b is 0.3 μm, 0.5 μm, and 0.1 μm. As is apparent from comparing these figures with each other, the inclination of the waveform within a range close to the zero-cross point or the width of the inclination does not change, even when the thickness of the main magnetic poles 109a and 109b is changed. Therefore, it is proved that neither resolution nor an S/N ratio depends on the thickness of the main magnetic poles as far as the thickness is varied within the range mentioned above.

Figure 11:
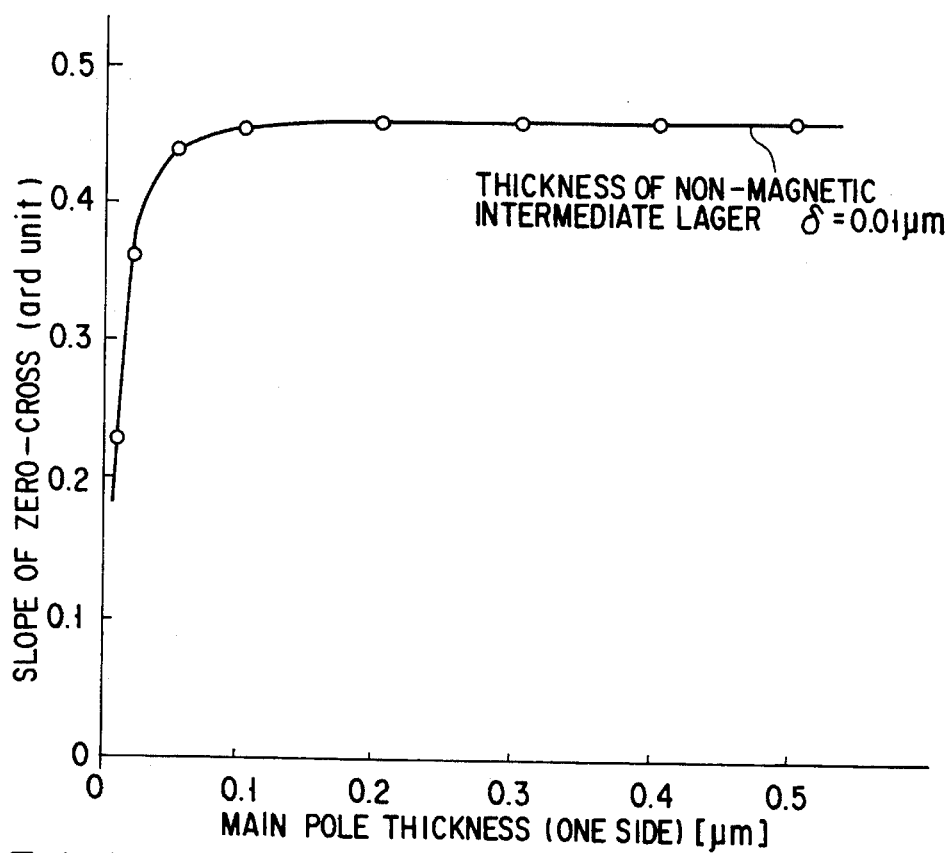
FIG. 11 is a graph illustrating the relationship between the slope of zero-cross and the thickness of the main poles, in the magnetic head shown in FIG. 5.

FIG. 11 shows changes in the inclination at zero-cross point where the thickness in the track direction of the main magnetic poles 109a and 109b is changed within a much larger range. As is apparent from this result, when the thickness of the main magnetic poles is 0.05 μm or more, the inclination at the zero-cross point does not depend on the thickness of the main magnetic poles.

FIG. 12 shows a differentiation reproduction signal when the thickness of the non-magnetic interlayer 110 is set to 0.1 μm. As is apparent from the figure, the inclination at the zero-cross point is smaller in this case.

Figure 13:
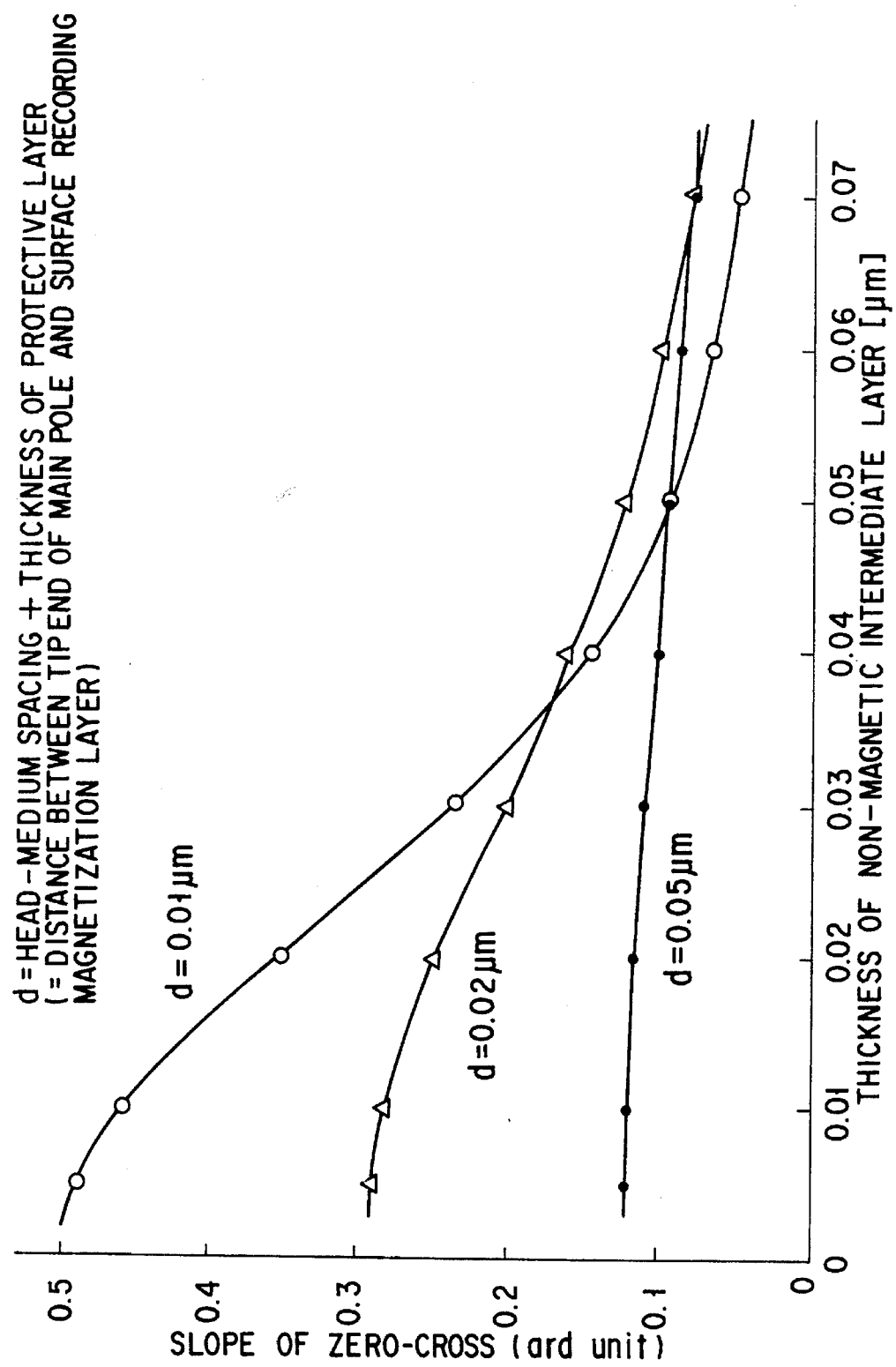
FIG. 13 is a graph illustrating the relationship between the slope of zero-cross and the thickness of the non-magnetic interlayer, in the magnetic head shown in FIG. 5.

FIG. 13 shows the inclination at the zero-cross point where the thickness of the non-magnetic interlayer 110 is changed within a large range. Apparently, the thinner the non-magnetic inter-layer is, the greater the inclination at the zero-cross point is and the better the S/N ratio is.

As has been explained above, in the magnetic head 101 incorporated in the magnetic disk system according to this embodiment, the recording sensitivity can be controlled independent of reproduction resolution and the reproduction sensitivity. Therefore, a high recording ability and a high reproduction resolution can be compatible with each other. Further, since the recording head has a head structure in which the recording portion and the reproduction portion are integrated as one unit, the recording center is apart from the reproduction center by only a submicron distance. Therefore, off-tracking can be prevented from occurring even when a yawing angle is present, and can sufficiently apply to magnetic disks having narrow tracks. Therefore, the recording density and reliability of the magnetic disk memory system can be improved according to this embodiment.

Further, since the magnetic disk memory system of this embodiment is driven with the magnetic head 101 and the magnetic disk 102 being in contact with each other, a spacing loss can be reduced to be small, so that signals can be recorded and reproduced with a high recording density. In addition, since abrasion of the MR element 114 and leakage of a sense current do not occur, the reliability of the head comprising the MR element can remarkably be improved, regardless of the contact recording.

Furthermore, due to the structure in which the direction of recording magnetic field is perpendicular to the surface the MR element 114, disturbance of the magnetic domain structure or the MR element are not incurred by the recording magnetic field. Therefore, stable signal reproduction can be achieved with less noise, so that the reliability of the magnetic disk memory system can be improved.

Embodiment 2

FIG. 14 is a view schematically showing a main part of the magnetic disk memory system according to another embodiment of the present invention, in form of a cross section cut along a relative moving direction between the head and the magnetic disk.

A magnetic disk 216 of a perpendicular magnetic recording method was manufactured in the following manner. At first, a soft magnetic backing layer 218 having a thickness of 0.12 μm and made of FeSi was formed on a glass substrate 217 having a diameter of 2.5 inches and a thickness of 0.635 mm by a DC magnetron sputtering in an argon gas atmosphere. A perpendicular magnetic anisotropic layer (magnetic recording layer) 220 having a thickness of 0.1 μm and made of CoCr was formed on the backing layer 218 by a DC magnetron sputtering in an argon gas atmosphere, with a sputtered carbon interlayer 219 being interposed therebetween. Further, a protective film 221 having a thickness of 0.005 μm and consisting of an SiN film was formed on the layer 220 by using an RF sputtering, in order to ensure a durability against its contact with a head. The soft magnetic backing layer 218 has a longitudinal coercivity (Hcs) of 60 Oe, and the magnetic recording layer 220 has a perpendicular coercivity (Hcs) of 1600 Oe.

A magnetic head 222 for recording a signal onto the magnetic disk 216 and reproducing a signal therefrom is constituted as follows. Main magnetic poles 224a and 224b made of an FeSi high magnetic permeability material are provided at a front end portion of a needle-like arm 223 made of SiC ceramics, the main poles 224a and 224b being formed by a high frequency sputtering. These main magnetic poles 224a and 224b are facing to each other in the track direction, and an front end of the each main magnetic pole is arranged so as to face the magnetic disk 216. The main magnetic poles 224a and 224b have a thickness of 0.1 µm in the track direction. A non-magnetic interlayer 225 made of $SiO_2$ is formed between the two main magnetic poles 224a and 224b, by using a high frequency sputtering. The non-magnetic interlayer 225 is 0.02 µm thick at a portion in close contact with the magnetic disk 216. A recording coil 226 covered with an insulating material 235 is provided between the main magnetic pole 224a and the needle-like arm 223. In this embodiment, the recording coil 226 has an half turn.

The main magnetic poles 224a and 224b and the non-magnetic interlayer 225 are curved at their rear end portions positioned opposite to the front end portions facing the magnetic disk 216, and the end surface of the front end is perpendicular to the end surface of the rear end. A spin valve element 232 consisting of a layered film of a permalloy layer 228, a Cu layer 229, a permalloy layer 230, and an FeMn layer 231 is provided on the end surface of the rear end portion, with an insulation layer 227 being inserted therebetween.

The spin valve element 232 is magnetically coupled with the main magnetic poles 224a and 224b. In addition, two copper Lead lines 233a and 233b are respectively connected to the upper and lower ends portions of the spin valve element 232. A sense current Is is supplied so as to flow through the spin valve 232 in the upward and downward directions by these copper lead lines 233a and 233b. The magnetizing direction of the permalloy layer 230 is fixed to a constant direction by a exchange coupling with an antiferromagnetic FeMn layer 231. In contrast, the magnetizing direction of the permalloy layer 228 can be changed by a magnetic flux applied to the spin valve element 232 from the magnetic disk 216 through the main magnetic poles 224a and 224b. The electric resistance of the spin valve element 232 changes, depending on a relative relationship between the magnetization direction of the permalloy layer 230 and the magnetization direction of the permalloy layer 228. Actually, the electric resistance of the spin valve element 232 has a minimum resistance when the magnetization directions of these two permalloy layers are parallel to each other, and the maximum electric resistance when the magnetization directions are anti-parallel to each other. Therefore, the spin valve element 232 has the same function as that of the MR element of the embodiment 1. Recording and reproduction are carried out with the magnetic head 222 and the magnetic disk 216 being in contact with each other.

Also in this embodiment, the spin valve element 232 does not have a contact with the surface of the magnetic disk 216. In addition, a recording magnetic field generated by the main magnetic poles 224a and 224b is perpendicular to the surface of the spin valve element 232. Therefore, the same effects as those in the embodiment 1 can be obtained.

Embodiment 3

Figure 15:
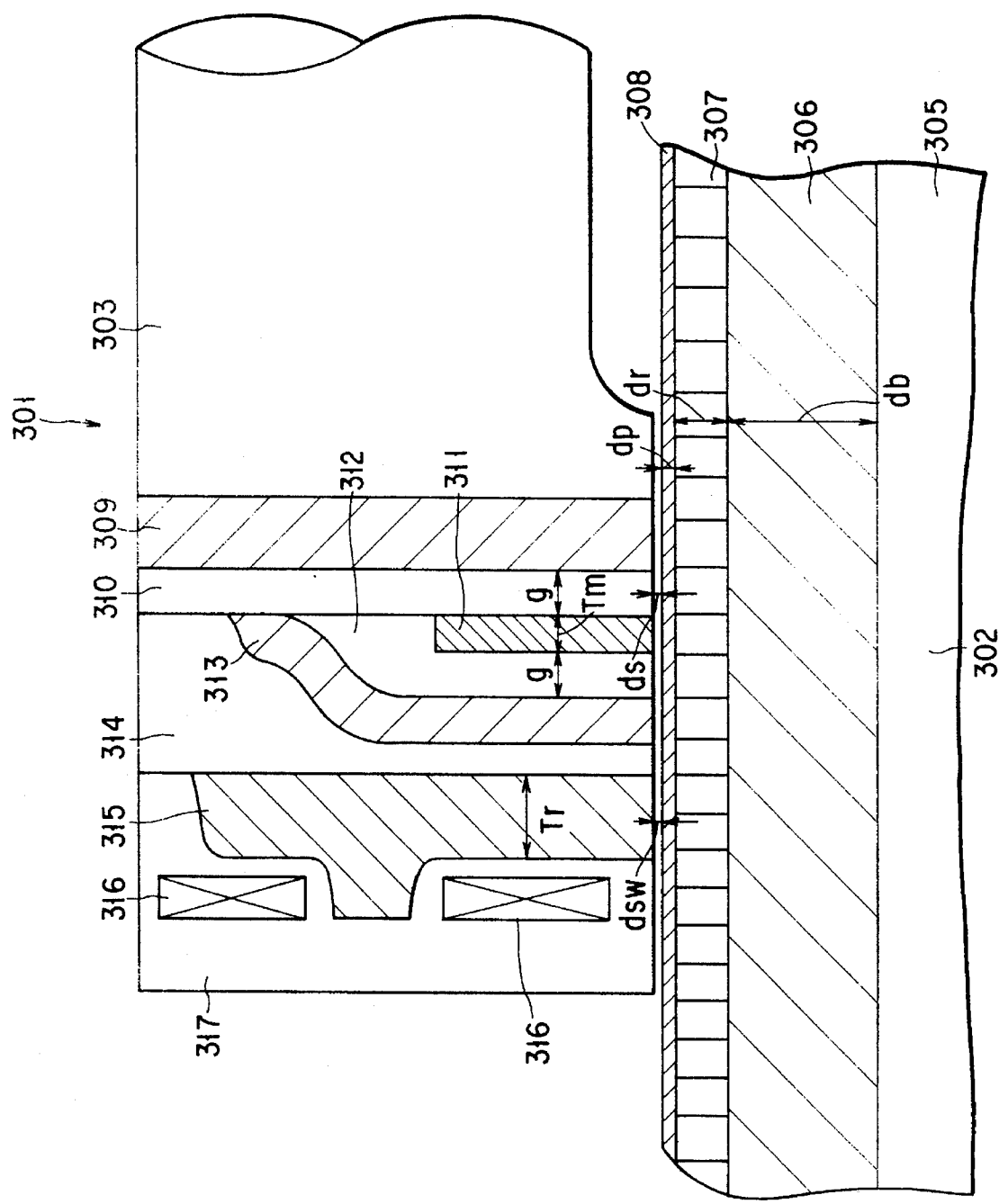
FIG. 15 is a diagram showing a cross section of a main portion of the magnetic disk memory system according to the third embodiment of the present invention.

FIG. 15 schematically shows a main part of the magnetic disk memory system according to the third embodiment of the present invention, in form of a cross section like FIG. 4.

The magnetic disk memory system of this embodiment comprises a magnetic head 301 and a magnetic disk 302, too.

The magnetic head 301 is provided for recording data onto a magnetic disk 302 of a perpendicular magnetic recording type, and for reproducing recorded data therefrom, and comprises an MR element for reproducing a magnetization signal. The magnetic head 301 is arranged in such a manner that it is brought into contact with the magnetic disk 302 by an arm 303. In addition, a plurality of coaxial tracks are formed in the magnetic disk 302, and the magnetic head 301 is positioned on a desired track by an actuator not shown in the figure.

The magnetic disk 302 is manufactured by layering a soft magnetic backing layer 306 and a magnetic recording layer 307 having a perpendicular magnetic anisotropy in this order on a disk-like non-magnetic material substrate 305, and by further layering a protective film 308 thereon. Specifically, a soft magnetic backing layer 306 having a thickness (db) of 0.2 µm and made of CoZrNb microcrystalline is formed on a glass substrate 305 having a thickness of 0.4 mm and a diameter of 1.8 inches, by using a high frequency sputtering in an argon gas atmosphere. A magnetic recording layer 307 having a perpendicular magnetic anisotropy and a thickness (dr) of 0.07 µm and made of CoPt is formed on the backing layer, by a DC magnetron sputtering in an argon gas atmosphere. A protective film 308 having a thickness (dp) of 0.01 µm and made of $ZrO_2$ is formed by an RF sputtering to ensure a durability and an insulation against contact with the head.

In the above magnetic disk 302, a soft magnetic backing layer 306 had a longitudinal coercivity (Hcs) of 5 Oe and a saturation magnetic flux density (Bsb) of 11000 G. Meanwhile, as a result of observation using a transparent electron microscope (TEM), the magnetic recording layer 307 had an average crystal grain diameter of 0.015 µm which was approximately one fifth of the film thickness. In addition, the magnetic recording layer 307 had a perpendicular magnetic anisotropy constant of $2.5 \times 10^5$ $J/m^3$ or more, a perpendicular coercivity (Hch) of 2500 Oe, and a saturation magnetization (Isr) of 10000 G. An operation (db.Bsb) of the film thickness (db) of the soft backing layer 306 and the saturation magnetic flux density (Bsb) was 2200 Gµm, and an operation (dr.Isr) of the film thickness (dr) of the magnetic recording layer 307 and the saturation magnetization (Isr) was 700 Gµm. Therefore, the above magnetic disk 302 satisfies a following relation;

$$of\ Bab.db > Isr.dr.$$

In a magnetic disk which satisfies this relation, soft magnetic backing layer 306 is difficult to be saturated, and this results in an effect that the magnetic disk has a strong magnetic coupling with the magnetic head.

The magnetic head 301 is constituted as follows.

In the figure, the reference numeral 303 denotes a needle-like arm made of ceramics. A magnetic shield film 309 made of CoZrNb high magnetic permeability material and having a thickness of 0.5 µm is formed at an end portion of the needle-like arm 303, by using DC sputtering. An MR element 311 is formed outside the magnetic shield film 309 by an ion beam sputtering, with a non-magnetic insulation layer 310 having a thickness of 0.2 µm being interposed therebetween. The MR element 311 is made of an NiFe alloy and has a film thickness Tm of 0.08 µm and a height of 16 µm. Specifically, the film thickness Tm of the MR element is sufficiently large in comparison with an average crystal grain diameter of 0.015 μm of the magnetic recording layer 307. In addition, a distance g between the magnetic shield film 309 and the MR element 311 is 0.2 μm equal to the film thickness of the non-magnetic insulation layer 310.

An non-magnetic insulation layer 312, a magnetic shield film 313, and a non-magnetic insulation layer 314 are formed on an outer surface (i.e., in the lefthand side in the figure). The distance g between the magnetic shield 313 and the MR element 311 is 0.2 μm.

The side surface of the non-magnetic insulation layer 314 in the left hand side in the figure is subjected to smoothing processing, and a main magnetic pole 315 used for recording is formed on the smoothed surface. The main magnetic pole 315 consists of a FeSi thin film having a thickness Tr of 0.5 μm formed by using a high frequency magnetron sputtering. A projection is formed in the center of the main magnetic pole. With a help of this projection, a magnetic flux generated by the recording coil 316 covered with an insulating material 317 effectively penetrates through the main magnetic pole 315.

The MR element 311 for reproducing has a front end (i.e., the lower end in the figure) which is exposed at the lower end of the magnetic head. However, a distance (ds) of about 0.01 μm on average still remains between the protective film 308 and the MR element 311 even when both of the film and the element are brought into contact with each other. In addition, as has already been explained above, the protective film 308 has a thickness (dp) of 0.01 μm. Therefore, a distance (ds+dp) between the front end of the MR element 311 and the magnetic recording layer 307 is 0.02 μm. As a result, the spacing (ds+dp) between the head and the recording medium, the film thickness (Tm=0.08 μm) of the MR element 311, and the film thickness (dr=0.07 μm) of the magnetic recording layer 307 satisfy the following relations:

$$ds+dp<Tm, \text{ and } ds+dp+dr<2Tm$$

Since a distance (dsw) between the front end of the main magnetic pole 315 and the protective film 308 is also 0.01 μm, a distance (dsw+dp) between the front end of the recording main magnetic pole 315 and the magnetic recording layer 307 is also 0.02 μm. Therefore, the spacing (dsw+dp) between the head and the recording medium, and the film thickness (Tr=0.5 μm) of the main magnetic pole satisfy the following relation:

$$2(dsw+dp)<Tr$$

In the magnetic disk memory system according to the above embodiment, a strong magnetic flux is generated by supplying a recording current flowing through the recording coil 316 when a signal is recorded. In this state, due to a magnetostatic coupling between the main magnetic pole 315 and the CoZrNb soft magnetic backing layer 306 of the magnetic disk, a large recording magnetic field having a sharp distribution is generated inside the CoPt magnetic recording layer 307 inserted between the main magnetic pole and the backing layer. As a result of this, the magnetic recording layer 307 is magnetized in the direction corresponding to the recording magnetic field.

On the other hand, in case of signal reproduction, a magnetic flux density flowing from the magnetic recording layer 307 to the MR element is changed thereby causing a rapid change in the electric resistance, when a magnetization reversal point passes through the front end surface of the MR element 311. This change in the resistance can be converted into a change in the voltage, to obtain a reproduction signal voltage, by supplying a sense current flowing through the MR element 311.

Figure 16:
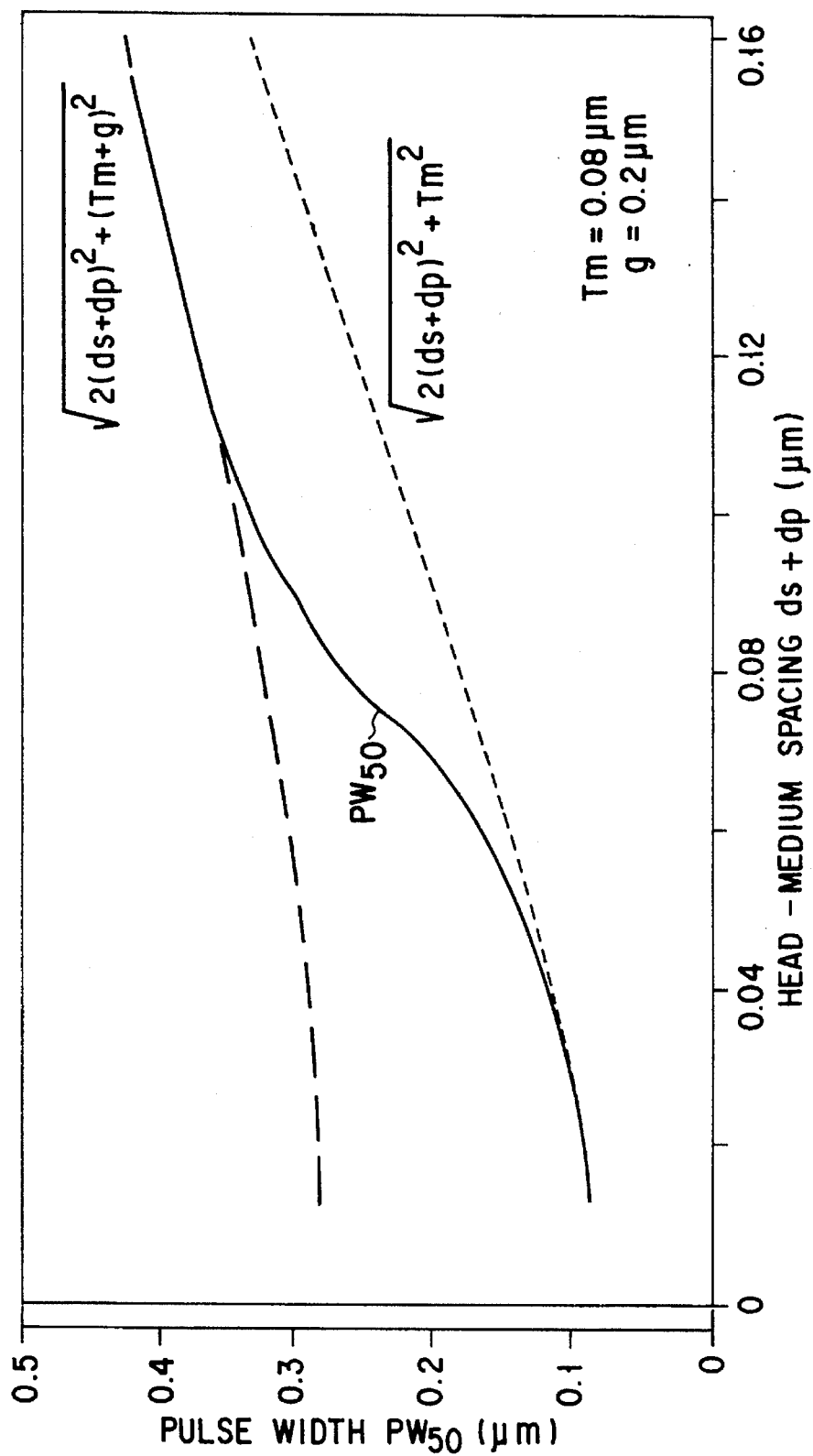
FIG. 16 is a graph illustrating the relationship between the pulse width of the reproduction signal and the spacing from head to medium, in the system shown in FIG. 15.

FIG. 16 shows a situation in which the pulse width ($PW_{50}$) changes when the spacing (ds+dp) between the head and the medium is varied. Note that, when an output voltage of the MR element 311 is V(x), the pulse width $PW_{50}$ is defined by a half value width of a differentiation signal (dV(x)/dx) of the output voltage.

As is apparent from FIG. 16, the pulse width $PW_{50}$ shows an asymptotic curve close to a curve in which resolution is defined by Tm+g, when the spacing (ds+dp) between the head and the medium is large in comparison with the film thickness (Tm) of the MR element 311. As has been explained, the value g means a clearance between the MR element 311 and the magnetic shield film 309. Meanwhile, when the spacing (ds+dp) is small in comparison with the film thickness (Tm), the pulse width $PW_{50}$ shows an asymptotic curve close to a curve in which resolution is defined by Tm. As a result of this, the following conclusion is obtained.

In the magnetic disk memory system according to the above embodiment, the reproduction resolution is determined, depending only on the film thickness (Tm), substantially regardless of the clearance g between the MR element 311 and the magnetic shield film 309, when the spacing (ds+dp) is sufficiently small in comparison with the film thickness (Tm) of the MR element. Therefore, it becomes possible to reproduce a signal which has a minimum recording wave length λ min shorter than the value of Tm+g.

It should be noted that, in a combination of a longitudinal recording medium and a shield type MR head, the reproduction resolution cannot be higher than Tm+g even when the value of ds+dp is reduced to be small. In contrast, in a combination of a shield type MR head and a magnetic disk 302 which includes a soft magnetic backing layer 306 and a magnetic recording layer 307 of a perpendicular magnetic anisotropy type, the reproduction resolution can be increased up to Tm/(Tm+g) by setting ds+dp to be sufficiently small in comparison with Tm.

Figure 17:
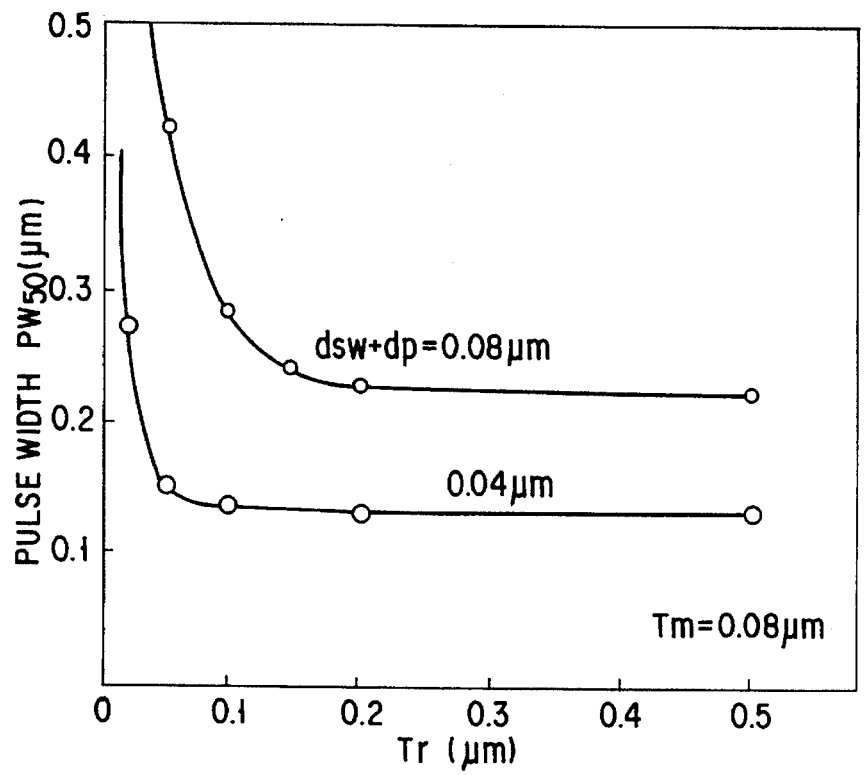
FIG. 17 is a graph illustrating the relationship between the pulse width of the reproduction signal and the thickness of the recording main pole, in the system shown in FIG. 15.

FIG. 17 shows a situation in which the reproduction pulse width ($PW_{50}$) varies when the thickness (Tr) of the main magnetic pole 315 used for recording is changed. As is apparent from the figure, when the thickness of the magnetic pole 315 is reduced to be smaller than a value which is two times as large as the value of the spacing (dsw+dp), the pulse width ($PW_{50}$) rapidly increases, thereby reducing the resolution. This is because a recording magnetic field generated by the main magnetic poles is reduced to be small, thereby enhancing the magnetization reversal width, when the main magnetic pole 315 is too thin. Therefore, recording with a higher density can be achieved by satisfying a relation of 2(dsw+dp)<Tr. Note that this relation commonly applies to the magnetic disk memory system according to the embodiments 1 and 2 described previously.

Embodiment 4

Figure 18:
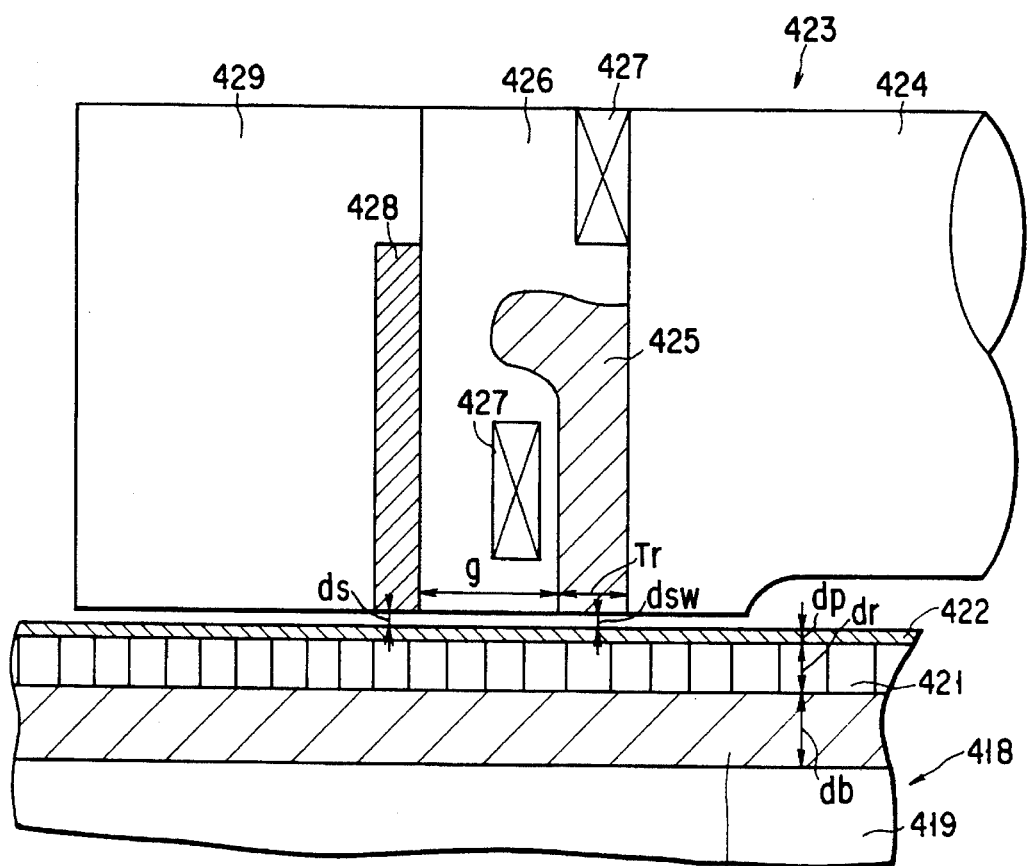
FIG. 18 is a diagram showing a cross section of a main portion of the magnetic disk memory system according to the fourth embodiment of the present invention.

FIG. 18 schematically shows a main part of the magnetic disk memory system according to the fourth embodiment of the present invention, in form of a cross section similar to FIG. 14.

A magnetic disk 418 of a perpendicular magnetic recording type was manufactured in the following steps. At first, a soft magnetic backing layer 420 having a thickness of 0.12 μm and made of FeSi was formed on a glass substrate 4418 having a diameter of 2.5 inches and a thickness of 0.535 mm by using a DC magnetron sputtering in an argon gas atmosphere. A magnetic recording layer 421 having a perpendicular magnetic anisotropy and a thickness (dr) of 0.1 μm and made of CoPtO was formed on the backing layer 420 by using a DC magnetron sputtering in an argon gas atmosphere, with a sputtered carbon interlayer 219 being interposed therebetween. Further, a protective film 422 having a thickness (dp) of 0.005 μm and consisting of an SiN film was formed on the layer 421, by using an RF sputtering, to ensure a durability and an insulation against its contact with a head.

In the magnetic disk 419 having a structure as stated above, the soft magnetic backing layer 420 has a longitudinal coercivity (Hcs) of 6 Oe and a saturation magnetic flux density (Bsb) of 15,000 G. with respect to characteristics of the magnetic recording layer 421 having a perpendicular magnetic anisotropy and made of CoPtO, the perpendicular coercivity (Hcs) was 1,600 Oe, the saturation magnetization (Isr) was 9,000 G, and the average crystal grain diameter was 0.01 μm. The magnetic disk of this embodiment also satisfies a relation of Bsb.db>Isr.dr.

The magnetic head 423 has the following structure.

In the figure, the reference numeral 424 denotes a needle-like arm made of SiC ceramics. A main magnetic pole 425 made of an FeSi high magnetic permeability material is formed on an end portion of the needle like-arm 424, by using a high frequency sputtering. The main magnetic pole 425 has a thickness (Tr) of 0.1 μm and a saturation magnetic flux density (BsA) of 18,000 G. A recording coil 427 covered with an insulating material 426 is provided on the left-hand side surface of the main magnetic pole 425 in the figure. In this embodiment, the recording coil 427 has one turn.

The side surface of the insulating material 426 positioning in the left-hand side in the figure is processed to be flat by machinery polishing. An MR element 428 made of an NiFe alloy is formed on the processed surface. The MR element 428 has a film thickness (Tm) of 0.06 μm and a height of 4 μm. In addition, a distance (g) between the MR element 428 and the main magnetic pole 425 is 0.3 μm near its end portion facing to the magnetic disk 418. A non-magnetic insulation layer 429 is formed on the side surface of the MR element 428 positioning in the left-hand side in the figure.

In this case, an average distance (ds) between the front end (the lower end in the figure) of the MR element 428 used for reproducing signals and the protective film 422 of the magnetic disk 418 is not zero due to the surface roughness even when the front end and the protective film are brought into contact with each other, and the distance (ds) is about 0.01 μm on average. Therefore, a distance between the front end of the MR element 428 and the magnetic recording layer 421 of the magnetic disk 418, i.e., a spacing between a head and a medium is ds+dp=0.015 μm. As a result, the spacing (ds+dp), the film thickness (Tm) of the MR element 428, and the thickness (dr) of the magnetic recording layer 421 (dr) satisfy the following relation:

$$ds+dp<Tm, \text{ and } ds+dp+dr<2Tm$$

In addition, a distance (dsw) between the front end (i.e., the lower end in the figure) of the main magnetic pole 425 used for recording and the protective film 422 is 0.01 μm equal to the value of ds. Therefore, the distance between the front end of the main magnetic pole 425 and the magnetic recording layer 421, i.e., the spacing (dsw+dp) between the head and the medium is 0.015 μm equal to the value of (ds+dp). Further, as has been explained above, the main magnetic pole 425 has a thickness (Tr) of 0.1 μm in the track direction. As a result of this, the spacing (dsw+dp) and the film thickness of the main magnetic pole 425 satisfy a relation expressed as follows.

$$2(dsw+dp)<Tr$$

In the magnetic disk memory system described above, an excellent recording and reproduction resolution can be achieved as in the embodiment 3.

Embodiment 5

Figure 19A:
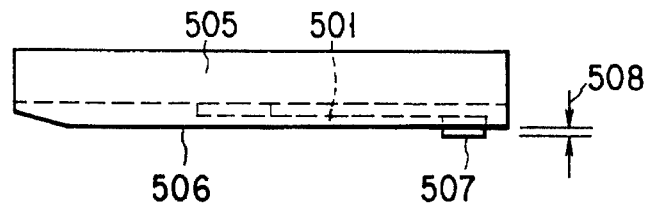
FIG. 19A is a diagram showing a side view of a head slider comprising a flying slider and a contact slider, employed in the magnetic disk memory system according to the fifth embodiment of the present invention.
Figure 19B:
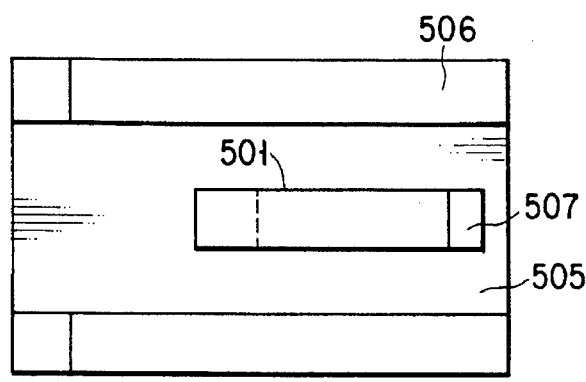
FIG. 19B shows a bottom view thereof.
Figure 19C:
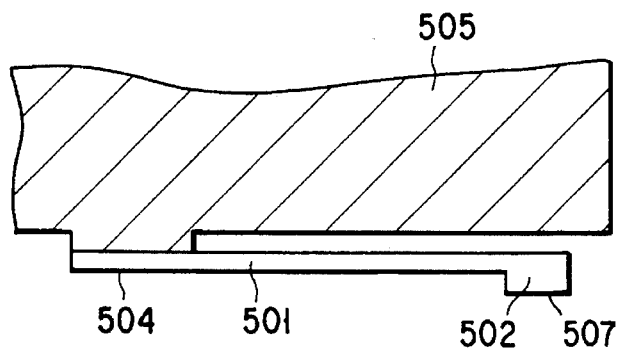
FIG. 19C shows a partially enlarged cross sectional view thereof.

FIGS. 19A to 19C show an example of a slider head mechanism incorporated in the magnetic disk memory system according to the present invention. FIG. 19A is a side view thereof, FIG. 19B is a bottom view, and FIG. 19C is an enlarged cross sectional view showing a part thereof equivalent to a contact slider.

The reference numeral 501 in the figure indicates a support member consisting of a plate-like member having a spring property. A contact slider 502 is provided at an end of this support member 501. A magnetic head (not shown) having an electromagnetic convertor portion formed, for example, with use of a thin film technique, is mounted on the contact slider 502. The other end 504 of the support member 501 is connected to a flying slider 505.

As shown in FIG. 19A, the sliding surface 507 of the contact slider 502 on which a magnetic head is mounted projects from the air-bearing surface of the flying slider 505 by a projecting amount indicated by the reference numeral 508.

Figure 20:
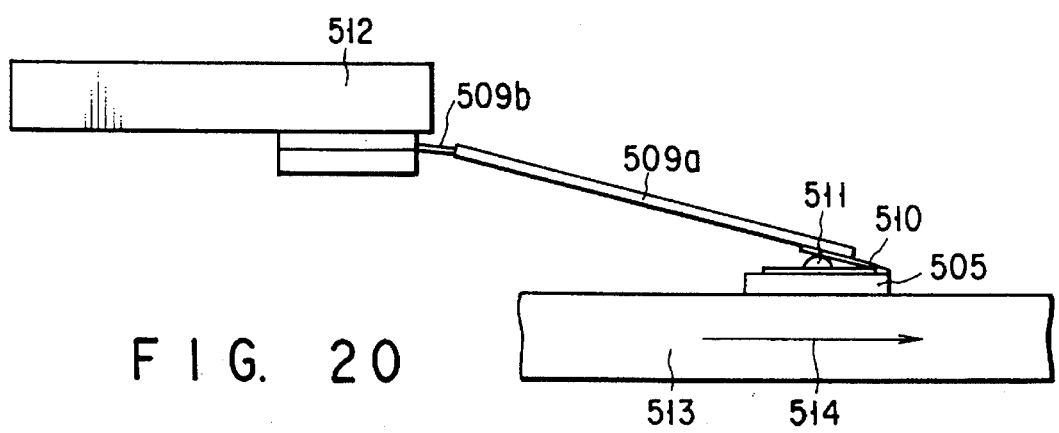
FIG. 20 is a side view showing a support mechanism for the flying slider.

As shown in FIG. 20, the flying slider 505 is fixed by a gimbal spring 510, a suspension arm 509a, and a suspension spring 509b to an actuator arm 512 which is used for positioning the magnetic head onto a desired track formed in the magnetic disk 513.

The flying slider 505 is pressed against the surface of the magnetic disk 513 with a constant spring force by the suspension spring 509b, through a pivot 511. The flying slider 505 is rotatable around the pivot 511, but the rotation of the slider is limited by the gimbal spring 510.

when the magnetic disk 513 is rotated in the direction indicated by an arrow 514, an environmental air around the disk is associated with the disk surface due to the viscosity of the air, thereby generating an air flow. Due to this air flow, a hydrodynamic pressure is generated between the surface of the disk 513 and the air bearing surface 506 of the flying slider 505, and a hydrodynamic force is thereby applied to the flying slider, in such a direction in which the slider moves apart from the surface of the magnetic disk. In this state, the flying slider 505 flies at a position where the hydrodynamic force due to the air flow is counter-balanced with a pressing force of the suspension spring 509b, with a constant flying height being maintained between the flying slider 505 and the disk surface. If the projecting amount 508 by which the sliding surface 507 of the contact slider 502 projects from the air-bearing surface 506 is set to be greater than the flying height by which the flying slider 505 is flying, the magnetic head portion can be pressed against the disk surface even when the magnetic disk 513 is rotated and the flying slider 505 is flying.

FIG. 21 shows an example of the structure consisting of a contact slider mounting a magnetic head, and a support member, and a preparing method of the structure.

A magnetic head 517 is formed on an end surface of a silicon substrate 515, by using a thin film forming technique from the direction indicated by an arrow 516. Then, the head surface 518 which contact with the magnetic disk is smoothed by polishing, to remove gaps between the silicon substrate and the magnetic head portion. Thereafter, the silicon substrate 515 is etched to remove a portion 519 indicated by oblique lines in the figure, and a support member 520 which serves as a plate spring is thus formed. A spring constant of the support member 520 can be decided by an etching amount 519. A thin metal film is deposited on a surface of the support member 520 which is not etched, and a wiring pattern for obtaining an electric connection to the magnetic head 517 can be formed by subjecting the thin metal film to patterning. The magnetic head 517 and support member 520, formed in this manner, are connected to an installation portion 504 of a flying slider 505, as shown in FIG. 19C. A metal wiring pattern is formed on the flying slider 502, in the same manner as stated above, although it is not shown in the figure. Therefore, wiring to the magnetic head can be formed, if wire bonding is carried out between terminals one of which is provided for conductive materials in the flying slider side and the other of which is provided for the wiring pattern of the support member 520.

Another example of the structure of the contact slider mounting a magnetic head, and the support member, and the method of preparing the structure is shown in FIG. 22. In this example, a magnetic head 523 is formed on a silicon substrate 521 from the direction of an arrow 522 by using a thin film forming technique, and thereafter, the silicon substrate is etched to remove an unnecessary portion 524 from the silicon substrate, thereby forming a plate spring portion 525.

In each of the above examples, a magnetic head is provided on a silicon substrate. However, an alumina substrate can be used in place of the silicon substrate.

Further, another example of the structure consisting of a slider portion mounting a magnetic head, and a support member, and the method of preparing the structure is shown in FIG. 23. In this example, a plastic film 526 such as a film made of polyimide is used as the support member, and a magnetic head 528 is formed on the support member from the direction indicated by an arrow 527, by using a thin film forming technique. This kind of plastic film 526 itself has a sufficient flexibility if it has an appropriate thickness, and therefore, this kind of plastic film does not require an etching process for forming a support member, as stated in the foregoing example. In addition, if the plastic film 526 is used as a support member, an excellent characteristic can be obtained, i.e., disturbances which may be caused by a friction generated at a contact portion with the support member and the magnetic disk can be reduced, since plastic has a high damping ratio with respect to mechanical vibrations.

The method of recording and reproducing information with the magnetic head being maintained in contact with the magnetic disk, by using a magnetic head mounted on a contact slider, can be applied to a so-called longitudinal magnetic recording system wherein the magnetic recording layer of the magnetic disk has an easy axis of magnetization which is parallel to the disk surface, as well as a so-called perpendicular magnetic recording system wherein the magnetic recording layer of the magnetic disk has an easy axis of magnetization which is perpendicular to the disk surface. In addition, the structure of the magnetic head may be a conventional head structure constituted by a recording/reproducing head which comprises a magnetic pole and a coil, or may be a head structure of an MR head type in which a recording head consisting of a magnetic pole and a coil is coupled with a reproducing head using an MR element.

In the embodiment as shown in FIG. 19, the support member 501 which supports the contact slider 502 mounting a magnetic head is installed in such a manner that one end of the support member 501 is fixed to the front side end (i.e., the left-hand side in the figure) of the flying slider 505, and that the magnetic head portion 502 of the contact slider is positioned in the rear end side (i.e., the right-hand side in the figure) of the flying slider 505. Otherwise, as shown in FIG. 24, the support member may be installed such that the fixed end 530 of the support member 529 is positioned in the rear end side of the flying slider 505, and that the magnetic head portion is positioned in the front end side of the flying slider 505.

Figure 25A:
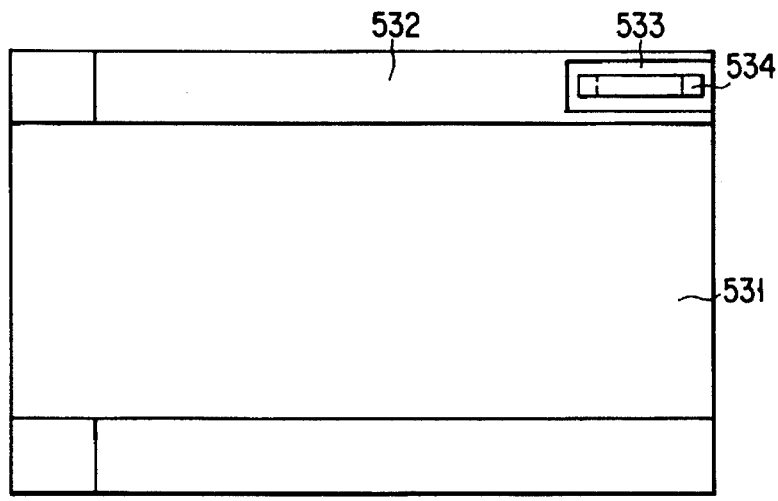
FIG. 25A is a diagram showing a plan view of still another example of the combination of a flying slider, a contact slider, and a magnetic head.
Figure 25B:
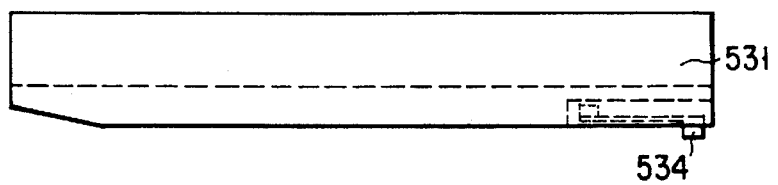
FIG. 25B shows a side view thereof.

As a method of providing the contact slider, as shown in FIGS. 25A and 25B, a concave portion 533 is provided in a portion of an air bearing surface 532 of the flying slider 531, and a contact slider 534 mounting a magnetic head may be provided in the concave portion 533.

Figure 26A:
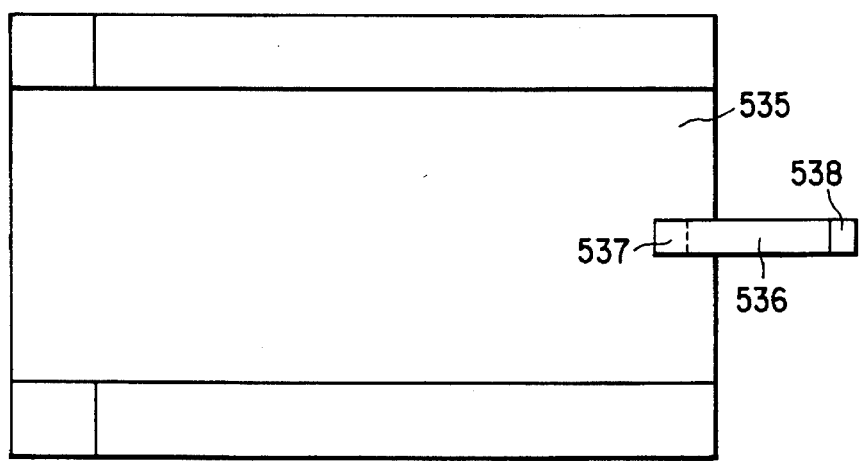
FIG. 26A is a diagram showing a plan view of still another different version of the combination of a flying slider, a contact slider, and a magnetic head.
Figure 26B:
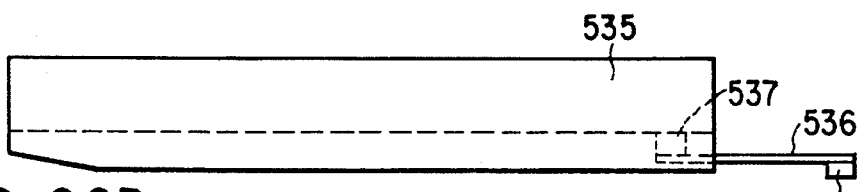
FIG. 26B shows a side view thereof.

As another practical example for providing a contact slider, an example is shown in FIGS. 26A and 26B. In this example, the fixed end 537 of the support member 536 is provided in the rear end side of the flying slider 535, and a proximal end of the support member 536 is connected to the fixed end 537. In this case, the support member 536 is installed such that the contact slider 538 is positioned behind the rear end of the flying slider 535.

With respect to the installation position of a contact slider, the contact point with a disk is desirably positioned in front of the pivoting point at which the flying slider is supported, as shown in FIG. 20. In this manner, an angular moment of a rotation around the pivot which is generated by pressing the magnetic head can be canceled with a moment around the pivot which generated by a friction incurred at the magnetic head portion. The stability of the attitude of the flying slider while it is flying can thus be much more improved.

The contact slider is pressed against the disk surface due to spring effects of the support member, as has been explained above. Therefore, the amount of a load with which the magnetic head mounted on the contact slider is pressed against the disk surface depends on a deformation of the support member. As a result, the support member 602 must be deformed by only a predetermined amount in order to press a head portion of the contact slider 603 against the disk surface 601 with a constant load, as shown in FIG. 27. When the deformation increases in excess, the angle of the contact between a sliding surface 604 of the contact slider and the disk surface is inclined as shown in FIG. 27, making it difficult to exactly bring the magnetic head into contact with the disk surface. To solve this problem, the support member 602 should desirably be previously deformed as shown in FIG. 28A. If the support member is thus deformed previously, the sliding surface 604 of the contact slider 603 can be maintained to be parallel with the disk surface, as shown in FIG. 28B, when a predetermined load is applied to the contact slider 603. Therefore, the sliding surface 604 and the disk can be paralleled. As a measure for previously deforming the support member 602, as shown in FIG. 28A, several methods may be considered, e.g., a method of depositing metal on one side surface of the support member 602 to bend the support member 602, and a method of irradiating a laser beam onto the support member 602 to attain a permanent thermal stress to deform the support member.

As another measure for improving the flatness of a contact between the sliding surface of the contact slider and the disk surface when the contact slider is pressed against the disk surface by deforming the support member, thin portions 608 may be formed at a part of the support member 607, as shown in FIG. 29A. In this case, a concentrated deformation occurs at the thin portions 608, as shown in FIG. 29B, when a load is applied which brings the sliding surface 606 of the contact slider 605 into contact with the disk surface 609. As a result, a link-like mechanism operates by using the thin portions 608 as hinges, so that the sliding surface 606 and the disk surface 609 can be maintained in parallel with each other due to the function of the mechanism.

In order to ensure a contact between the magnetic head portion of the contact slider and the disk surface, a measure shown in FIG. 30 may be used in place of the methods as stated above. In this measure, a sense portion 613 of a magnetic head 612 is positioned at a portion of the contact slider 610, which portion contacts most strongly with the disk surface 611. In FIG. 30, a magnetic head 612 is provided at a front edge portion of the contact slider. However, the position of the magnetic head 612 is not limited to the front edge portion of the contact slider 610.

The plan view of the support member which functions as a plate spring is not limited to a ribbon-like shape as explained before, but may be a triangle as shown in FIGS. 31A and 31B. In these figures, the reference numeral 621 denotes a triangle support member, the reference numeral 622 denotes a contact slider on which a magnetic head is mounted, the reference numeral 623 denotes a fixing portion, and the reference numeral 624 denotes a flying slider or track positioning mechanism.

When a load is applied to the sliding portion of the contact slider 622, the maximum normal stress which acts on the cross section of the support member 621 is largest at the fixing portion 623 and is gradually decreased toward the front end of the support member. Therefore, in case where the support member has a ribbon-like shape with a uniform width as in the above example, the support member has much durability in excess against a bending force at the front end portion than normally required. On the other hand, in case of the support member 621 which has a triangular shape in its plan view, the maximum normal stress which acts on the cross section of the support member 621 can be uniform at any position of the support member. In addition, since an excessive material which will otherwise be used at the front end portion can be removed, the support member 621 can be lighter. When the support member 621 having a triangular plan view is compared with another support member having a ribbon-like plan view on a condition that both support members are designed such that an equal maximum normal stress is generated at the installing portion 623, the support member 621 of triangular shape vertically deforms 1.5 times as great as that of the support member having the ribbon-like shape. This means that for the same vertical position change of the contact slider 622, the change of the normal load caused by deformation of the support member 621 is decreased to ⅔. Therefore, it is possible to obtain an advantage of a wider range of allowable vertical positioning errors concerning the head size and the support member installation position, by forming the support member 621 so as to have a triangular plan view. Meanwhile, on another condition that both support members are designed to have an equal deformation in the normal direction at their front ends for the same normal load, the width of the fixing portions 623 of the support member 621 having a triangular shape is 1.5 times as large as that of the other support member having a ribbon-like shape. As a result of this, when a connection wiring for the magnetic head is to be provided on the support member 621, a space to be occupied by a connection terminal of the wiring can be enlarged to make electrical connection easier.

Further, the support member which functions as a plate spring may be v-shaped, as shown in FIGS. 32A and 32B. In the figures, the reference numeral 625 denotes a v-shaped support member, the reference numeral 626 denotes a contact slider mounting a magnetic head, the reference numeral 627 denotes fixing portions, and the reference numeral 628 denotes a flying slider or track positioning mechanism. A V-shaped support member 625 has a higher rigidity in the horizontal direction than a support member having a ribbon-like shape if the support members are designed so as to have the same rigidity in the vertical direction on a condition that the support members have a uniform thickness. Therefore, an advantage can be obtained in that a head positioning accuracy for the track positioning is improved.

Although several examples of the shape of the support member have been explained, the shape of the support member is not limited to these examples. The support member may be formed to have a different shape other than the above, to optimize the bending rigidity or the torsional rigidity.

As has been explained above, in this embodiment, a magnetic head having an electromagnetic converter is mounted on a contact slider, and this contact slider is connected to a flying slider through a support member, thereby to press the magnetic head and a contact slider against a disk surface by the spring force of the support member. Therefore, the magnetic head can be brought into contact with the disk surface even while the flying slider is flying above the disk surface, and recording and reproducing can be carried out with the magnetic head thus being in contact with the magnetic disk.

In the above embodiment, explanation has been made to examples having a structure in which a contact slider mounting a magnetic head is connected to a flying slider through a support member manufactured independently from this element. However, both the support member and the contact slider may be formed to be integral with the flying slider, for example, by combining a thin film deposition technique with an etching technique.

Figure 33A:
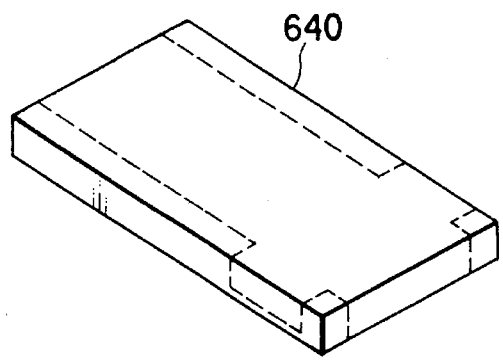
FIGS. 33A and 33B are diagrams illustrating a method of manufacturing a flying slider, a support member and a contact slider, as an integral one part.
Figure 33B:
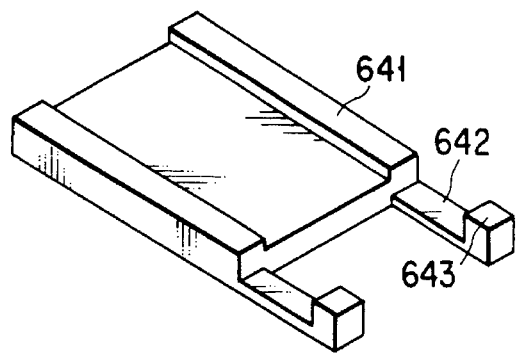
Figure 34:
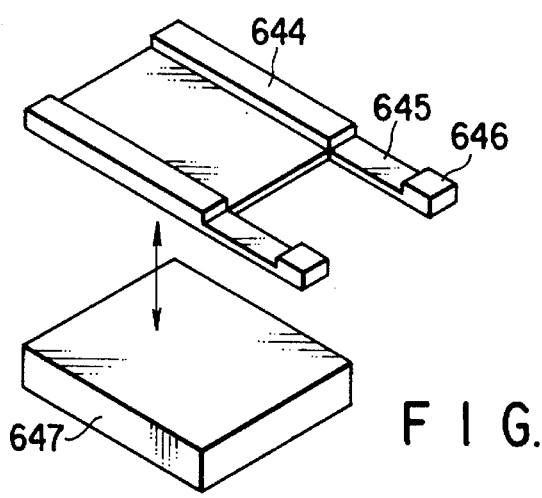
FIG. 34 is a diagram illustrating still another example of the method of manufacturing a flying slider, a support member and a contact slider.

FIGS. 33A and 33B and FIG. 34 show an example in which both the contact slider and the support member are formed to be integral with the flying slider.

In the example shown in FIGS. 33A and 33B, for example, a magnetic head portion is formed on a silicon substrate 640 by a thin film deposition technique, as shown in FIG. 33A, and thereafter, unnecessary portions are etched to form a flying slider portion 641, a support member portion 642, and a contact sliding portion 643, as shown in FIG. 33B.

In the example of FIG. 34, a thinner substrate is used than that used in the example of FIGS. 33A and 33B. A magnetic portion is formed on the substrate, and thereafter etching is performed, thereby to form a flying slider portion 644, a support member portion 645, and a contact sliding portion 646. Further, the flying slider portion 644 is connected to a slider block 647 which is separately manufactured. In this example, since a thinner substrate is used, there is an advantage that an etching is carried out for a shallower depth than in the example of FIGS. 33A and 33B.

Embodiment 6

In the embodiment 5, explanation has been made to a magnetic disk memory system in which a contact slider mounting a magnetic head is installed on a flying slider through a support member having an elasticity, and recording and reproducing are carried out with the magnetic head portion maintained in contact with the magnetic disk surface.

Figure 35:
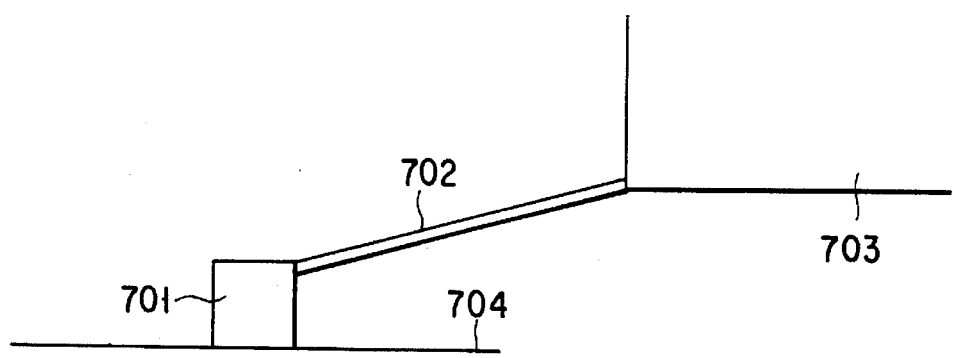
FIGS. 35, 36A and 36B are diagrams designed to explain the problem which occurs when a magnetic head mounted on a contact slider it brought into contact with the surface of a magnetic disk by means of the spring force of a support member.

However, as shown in FIG. 35, it is possible to adopt a structure in which the contact slider 701 may be installed directly on a track positioning mechanism 703 for the magnetic head (not the flying slider), through the support member 702 having an elasticity. In this case also, recording and reproducing can be carried out with the magnetic head being maintained in contact with a magnetic disk surface 704.

A feature common to the example shown in FIG. 35 and the example shown in the previous embodiment 5 is that a contact slider including a magnetic head is supported by a support member having an elasticity and this slider with itself being maintained in contact with the magnetic disk surface.

Figure 36A:
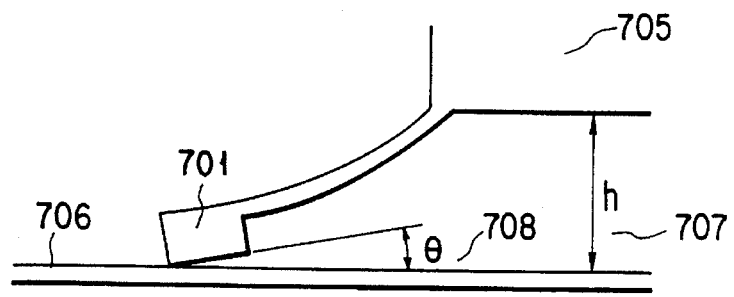
Figure 36B:
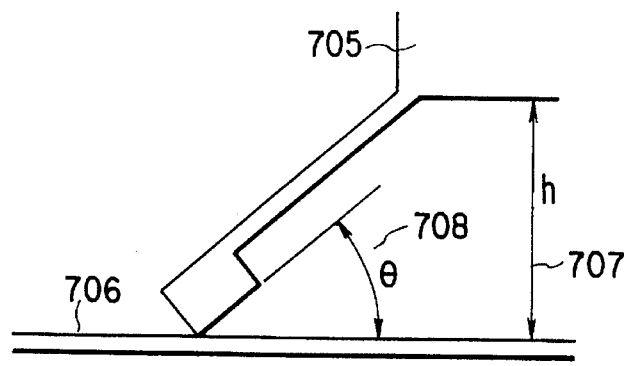

There is, however, a problem common to these structures, i.e., as shown in FIGS. 36A and 36B, an angle θ (708) between the magnetic disk surface 706 and the sliding surface of the contact slider 701 is changed when a distance h (denoted by the reference numeral 707 in the figures) between a fixing end 705 of the support member and a magnetic disk surface 706 is changed. If the angle θ is thus changed, excellent recording and reproducing characteristics cannot be expected.

Figure 37A:
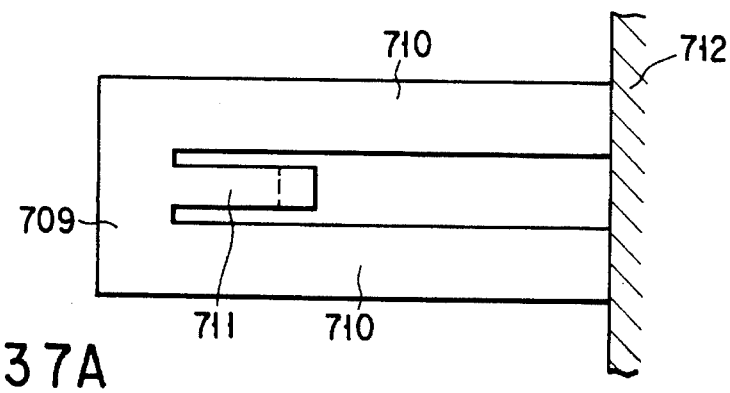
FIG. 37A is a diagram showing a plan view of peripheral members (support member having returned beam structure) of a magnetic head, built in the magnetic disk memory system according to the sixth embodiment of the present invention.
Figure 37B:
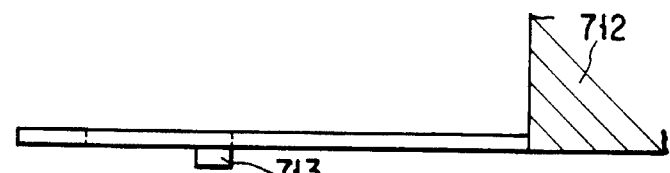
FIG. 37B shows a side view thereof.

Therefore, to solve this problem, a support member 709 having a returned beam structure comprising two main beams 710 and one sub beam 711 is used in this embodiment, as shown in FIGS. 37A and 37B. In addition, proximal end portions of the main beams 710 are fixed to a fixing end 712, and a contact slider 713 including a magnetic head is provided at a distal end of the sub beam 711.

Figure 38A:
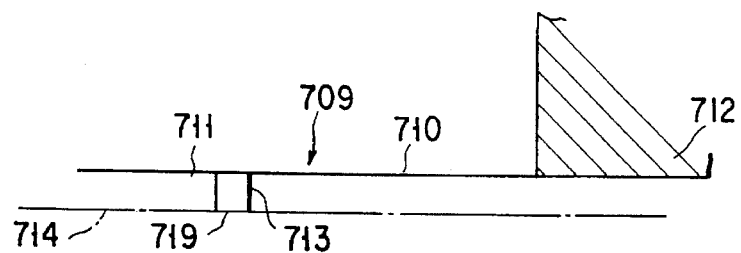
FIGS. 38A and 38B are diagram illustrating the action of the support member shown in FIGS. 37A and 37B.
Figure 38B:
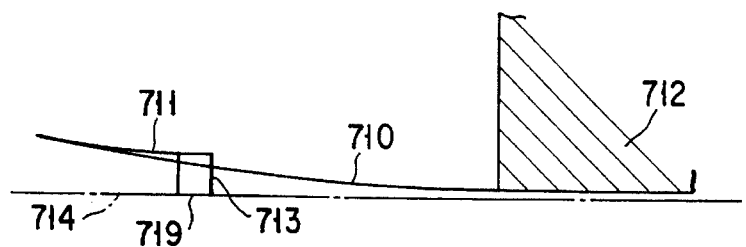

FIGS. 38A and 38B schematically show an operation of the support member 709 having the returned beam structure stated above. FIG. 38A shows a case where a large distance exists between the disk surface 714 and the fixing end 712 of the support member 709, while FIG. 38B shows another case where a small distance exists between the disk surface 714 and the fixing end 712 of the support member 709.

In the case of FIG. 38A, the deformation of the main beams 710 and the sub beam 711 is very small (not shown in FIG. 38A), and the sliding surface 719 of the contact slider 717 has a normal contact with the disk surface 714. On the other hand, in the case of FIG. 38B, the contact slider 731 is pushed upward by the disk surface 714, and the main beams 710 and the sub beam 711 are deformed as shown in the figure. However, if appropriate lengths and bending rigidities are selected for the main and sub beams 710 and 711, the deflection angle of the main beams 710 and the deflection angle of the sub beam 711 can be canceled each other, so that, in this case, the sliding surface 719 of the contact slider 713 can be normally brought into contact with the disk surface 714. Therefore, even when the distance between the disk surface 714 and the fixing end 712 of the support member 709 is changed, the angle θ (which is 0 degree in this case) between the disk surface 714 and the sliding surface 719 of the contact slider 713 can be maintained to be a constant.

Figure 39:
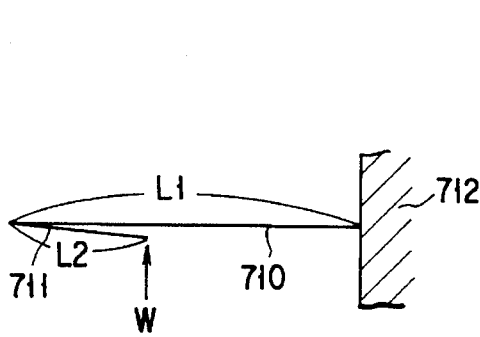
FIG. 39 is a diagram illustrating the operation principle of the embodiment shown in FIGS. 37A and 37B.

An deflection angle of a main beam 710 and that of the sub beam 711 will be explained below, with reference to FIG. 39. The main beam 710 has an end fixed to a fixing end 712 and another end connected to the sub beam 711. The sub beam 711 has a free distal end provided with a contact slider including a magnetic head, although the contract slide is omitted from the figure. A reaction force generated by pressing the contact slider against the disk surface is imposed on the free distal end of the sub-beam 711.

In the following explanation, the length of the main beam 710 is $L_1$, the geometrical moment of inertia thereof is $I_1$, and the Young's modulus thereof is $E_1$, and that the length of the sub beam 711 is $L_2$, the geometrical moment of inertia thereof is $I_2$, the Young's modulus thereof is $E_2$, and the amount of the pressing force is W.

An angle of inclination $i_1$ of the front ends of the main beam is represented based on a load and a moment applied to the front ends, as follows:

$$i_1 = (WL_1^2)/(2E_1I_1) - (WL_1L_2)/(E_1I_1)$$

Where the main beam 710 and the sub beam 711 satisfy a relation of $L_2 = L_1/4$, the following formula is obtained:

$$i_1 = (WL_1^2)/(4E_1I_1)$$

On the other hand, an angle of inclination $i_2$ of the sub beam is obtained as follows:

$$i_2 = WL_2^2/2E_2I_2 = WL_1^2/32E_2I_2$$

In order to cancel an amount of the angle of inclination $i_1$ of the main beam 710 with an amount of the angle of inclination $i_2$ of the sub beam 711, an equation of $i_1 = i_2$ must be satisfied. Therefore, by substituting the $i_1$ and $i_2$ into the formula of $i_1 = i_2$, it is concluded that the angle of inclinations of the main and sub beams cancel each other when the bending rigidities thereof satisfy the following relation:

$$E_1I_1/E_2I_2 = 8$$

Where the main beam 710 is made of the same material as that of the sub beam 711, the above relation will be as follows:

$$I_1/I_2 = 8$$

As a conclusion, the angle θ defined between the sliding surface 719 of the contact slider 713 and the disk surface 714 can be maintained to be constant, independently from the movement of the contact slider in the vertical direction, by selecting appropriate shapes and cross section sizes for both beams in such a manner that the ratio between the geometrical moments of inertia satisfies $I_1/I_2 = 8$, where the length $L_1$ of the main beam 710 and the length $L_2$ of the sub beam 711 satisfy a relation of $L_1/L_2 = 4$, For example, in such cases that both of the main and sub beams 710 and 711 are formed to have rectangular cross sections and both of the beams have an equal thickness, the angle of inclinations of the contact surface of the contact slider will be zero when the width of the main beam 710 is eight times as large as the width of the sub beam 711. In the example which has been explained with reference to FIG. 39, the main beam 710 is considered as one single piece. However, it is apparent that the same relation can be obtained where the main beam 710 is divided into two pieces as shown in FIG. 37.

In the above embodiment, explanation has been made to a case in which the inclination angle of the front end of the sub beam 711 is not changed even when the distance between the installation position of the main beam 710 and the disk surface 714 is changed. However, the inclination angle of the front end of the sub beam can be freely set in correspondence with a change in the distance between the installation position of the main beam 710 and the disk surface 714, if appropriate lengths and bending rigidities are selected for the main and sub beams 710 and 711.

Figure 40:
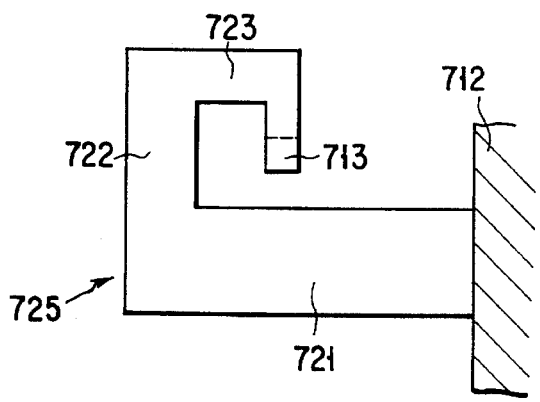
FIG. 40 is a diagram showing a plan view of another example of the support member having a returned beam structure.

In the above embodiment, the returning direction between the sub beam 711 and the main beam 710 of the support member 709 is arranged so as to coincide with a tangent direction of the disk, thereby to control the angle θ with respect to the tangent direction of the disk, between the sliding surface 719 of the contact slider 713 and the disk surface 714. However, the returning direction of the beams 710 and 711 may otherwise be arranged so as to coincide with a radial direction of the disk, so that the inclination of the contact slider 713 along the radial direction of the disk can be controlled. Further, if a support member 725 consisting of a combination of a pair of beams 721 and 723 so as to extend in the tangent direction of the disk and another pair of beams 722 and 724 so as to extend in the radial direction of the disk, as shown in FIG. 40, the inclinations of the contact slider 713 in both directions can be controlled. Specifically, if the support member is designed such that the beam 721 has the same angle of inclination as that of the beam 723 and the beam 722 has the same angle of inclination as that of the beam 724, changes in the angle of inclinations of the contact slider 713 in the two different directions can cancel each other.

FIGS. 41 to 45 schematically show the path by which a sense current $I_s$ is supplied to an MR element mounted on a magnetic head.

Figure 41:
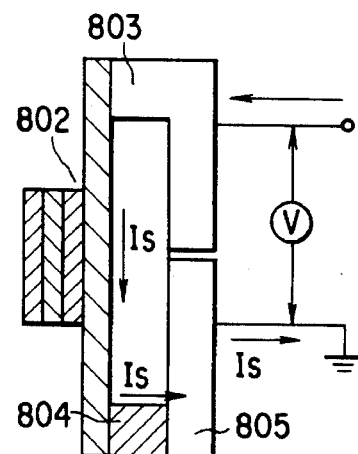
FIG. 41 is a diagram showing the first example of the path for supplying a sense current to the MR element.
Figure 41:
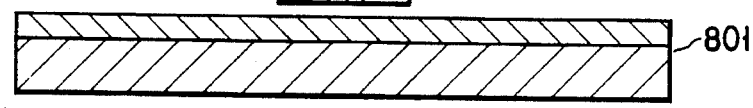

In FIG. 41, the reference numeral 801 denotes a magnetic disk and the reference numeral 802 denotes an MR element for reproducing a signal, which is provided perpendicular to the surface of the magnetic disk 801. In this example, a sense current $I_s$ is supplied by a path extending through a return yoke 803 made of a conductive soft magnetic material, an MR element 802, a conductive non-magnetic material 804, and a return yoke 805 made of a conductive soft magnetic material.

Figure 42:
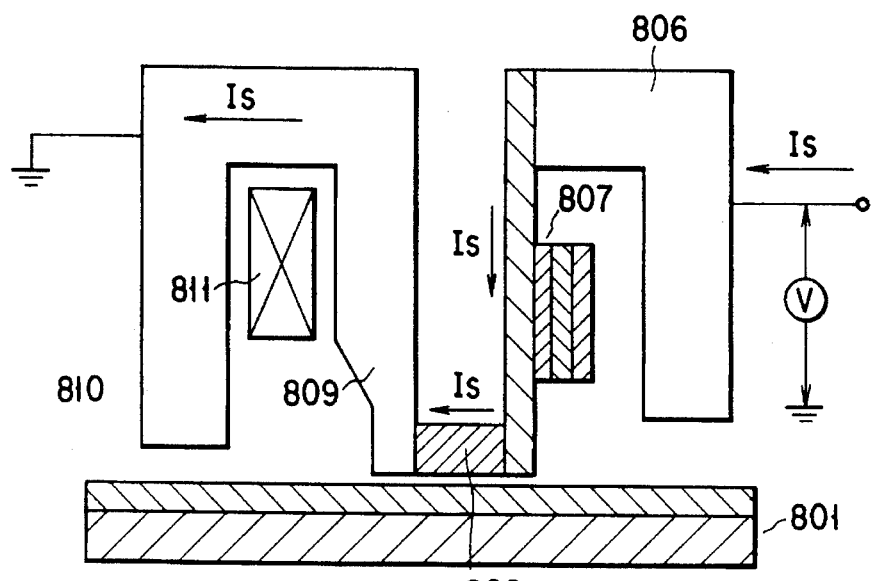
FIG. 42 is a diagram showing the second example of the path for supplying a sense current to the MR element.

In the example shown in FIG. 42, a sense current $I_s$ is supplied by a path extending through a return yoke 806 made of a conductive soft magnetic material, an MR element 807, a conductive non-magnetic material 808, a main pole 809 for recording and a return yoke 810 of recording side. Note that the reference numeral 811 denotes a recording coil.

Figure 43A:
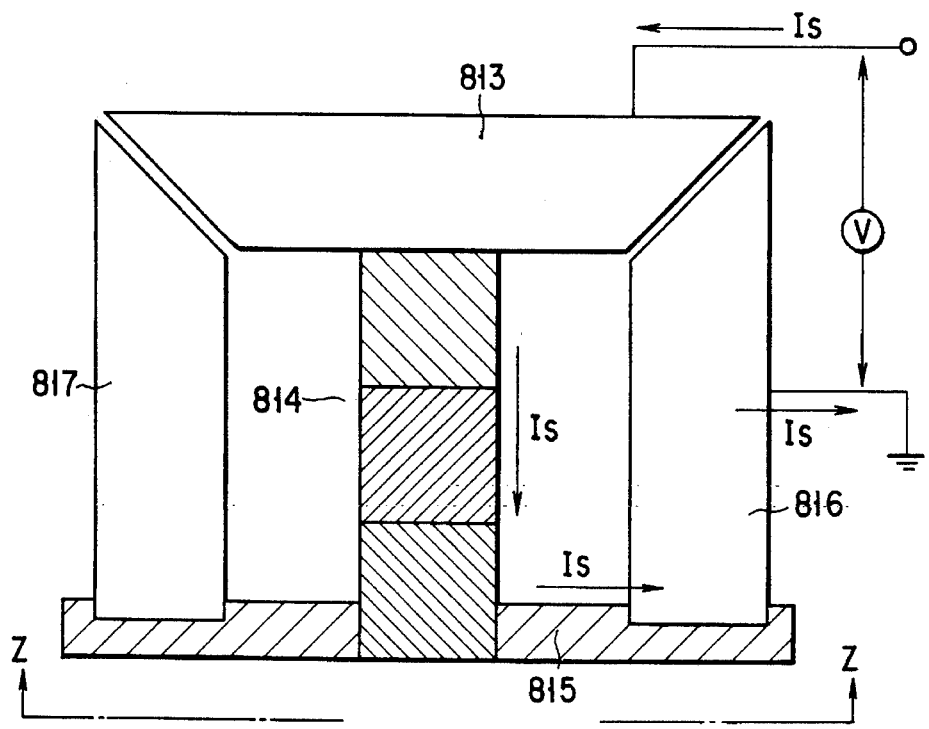
FIG. 43A is a diagram showing the third example of the path for supplying a sense current to the MR element.
Figure 43B:
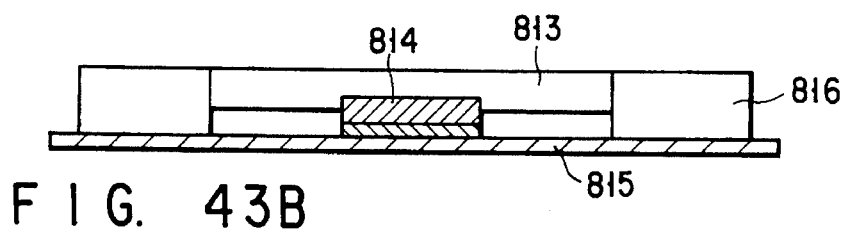
FIG. 43B is a view of the path structure shown in FIG. 43A taken from the direction indicated by Z—Z line.

In the example shown in FIGS. 43A and 43B, a sense current $I_s$ is supplied through a path extending through a return yoke 813, an MR element 814, a conductive non-magnetic material 815, and a return yoke 816 made of a conductive soft magnetic material. Note that the reference numeral 817 in the figure also denotes a return yoke.

In the example shown in FIG. 44, a sense current $I_s$ is supplied by a path extending through a magnetic shield 818 made of a conductive soft magnetic material, a conductive non-magnetic material 819, an MR element 820, a conductive non-magnetic material 821, and a magnetic shield 822 made of a conductive soft magnetic material.

In the example shown in FIG. 45, a sense current $I_s$ is supplied by a path extending through a magnetic shield 823, a conductive non-magnetic material 824, an MR element 825, a conductive non-magnetic material 826, and a magnetic shield 827 made of a conductive soft magnetic material.

As has been explained above, in any of the examples shown in FIGS. 41 to 45, a sense current $I_s$ is supplied through conductive soft magnetic materials, such as a magnetic shield, a return yoke, and the likes, which are provided close to the MR element. Therefore, a lead needs not be provided at a small distance between an MR element and a magnetic shield, or the likes, so that the clearance between the MR element and the magnetic shield can be reduced to be much smaller and the resolution determined by the clearance can thus be improved. Further, since the distance between the MR element and the magnetic shield can thus be reduced to be smaller, the reproduction efficiency can be improved. In addition, a heat generated by the MR element can be transferred to a magnetic shield, a return yoke, and the likes, through conductive non-magnetic materials. Therefore, an excellent heat dissipation characteristic can be obtained, and characteristic deterioration and damages of the MR element due to a heat can thus be prevented.

Embodiment 7

Figure 46:
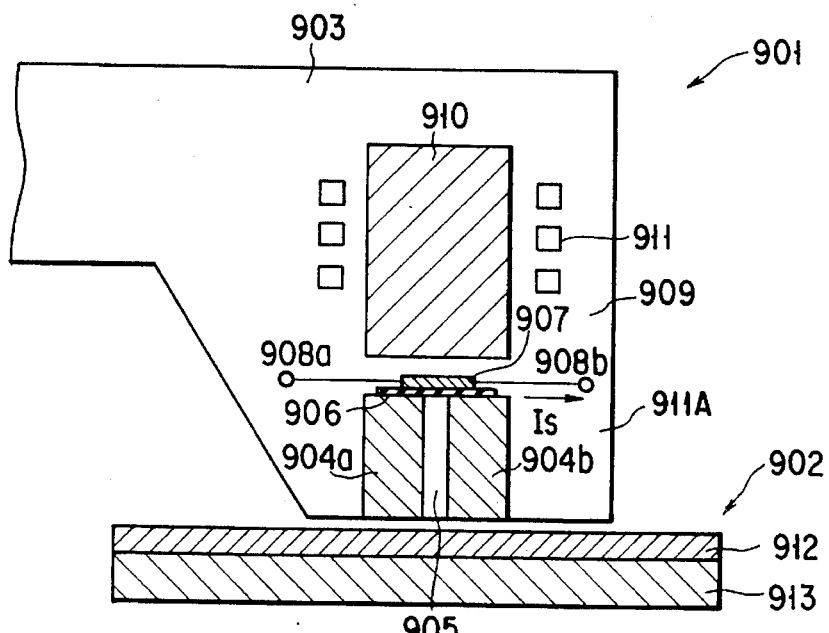
FIGS. 46 to 49 are diagrams respectively showing seventh embodiment to tenth embodiment of the magnetic disk memory system according to the present invention.

FIG. 46 schematically shows a main part of the magnetic disk memory system according to another embodiment of the present invention, in form of a cross section cut along a relative moving direction of a magnetic head 901 and a magnetic disk 902.

In the figure, the reference numeral 903 denotes a needle-like arm having a front end on which an electromagnetic converter part of the magnetic head is mounted. There are provided at the front end of the arm 903, main magnetic poles 904a and 904b having a soft magnetism and made of a CoFe-based alloy. These main magnetic poles 904a and 904b are provided so as to extend in a direction perpendicular to the surface of a magnetic disk 902. Further, the main magnetic poles 904a and 904b face each other in the track direction, and a non-magnetic interlayer 905 made of $SiO_2$ is interposed posed between the main poles. The main magnetic poles 904a and 904b are respectively 0.25 μm and 0.3 μm thick in the track direction, and the non-magnetic interlayer 905 is 0.03 μm thick. In addition, the main magnetic poles 904a and 904b are 0.5 μm high.

The main magnetic poles 904a and 904b are provided such a manner that a tip end of each main magnetic pole is positioned so as to face the magnetic disk 902. Each of the main magnetic poles 904a and 904b has another end provided with an MR element 907, with an insulation layer 906 being interposed therebetween. The MR element 907 is provided in such a way that its film surface is in parallel with the surface of the magnetic disk 902, i.e., such that the film surface of the MR element 907 is perpendicular to a direction in which the main magnetic poles 904a and 904b extend. The MR element is thereby magnetically coupled with the main magnetic poles 904a and 904b. Both end in the track width direction of the MR element 907 are connected with two copper lead lines 908a and 908b, so that a sense current Is can flow through the copper lead lines in the track width direction. A return magnetic pole 910 made of a CoZr-based amorphous alloy is provided on the MR element 907 with an insulation layer 909 being interposed therebetween, and the return magnetic pole 910 is magnetically coupled with the main magnetic poles 904a and 904b. A recording coil 911 having three turns is wound around the return magnetic pole 910. When a recording current which flows through the recording coil 911A is supplied, recording magnetic field is applied to a perpendicular magnetic recording layer 912 of the magnetic disk 902, through the return magnetic pole 910 and the main magnetic poles 904a and 904b magnetically coupled therewith. The main magnetic poles 904a and 904b are magnetically coupled with a soft magnetic backing layer 91 of the magnetic disk 902. Recording and reproducing efficiencies are improved by the soft magnetic backing layer 913. In addition, recording and reproducing with use of the magnetic head 901 are carried out with the magnetic head 901 and the magnetic disk 902 being in contact with each other.

The above embodiment is different from the embodiment 1 previously described in that the recording coil 911 is not wound around the main magnetic poles 904a and 904b, but are wound around the return magnetic pole 910 provided on the main magnetic poles. As a result, the height of a pair of main magnetic poles 904a and 904b can be reduced regardless of the size and the number of turns of the recording coil 911, so that the reproducing efficiency of the MR element 907 can be improved. Conversely speaking, the size and the number of turns of the recording coil can be increased without increasing the height of the pair of main magnetic poles 904a and 905b, so that a stronger recording filed can be applied with a high reproducing efficiency being maintained.

Embodiment 8

Figure 47:
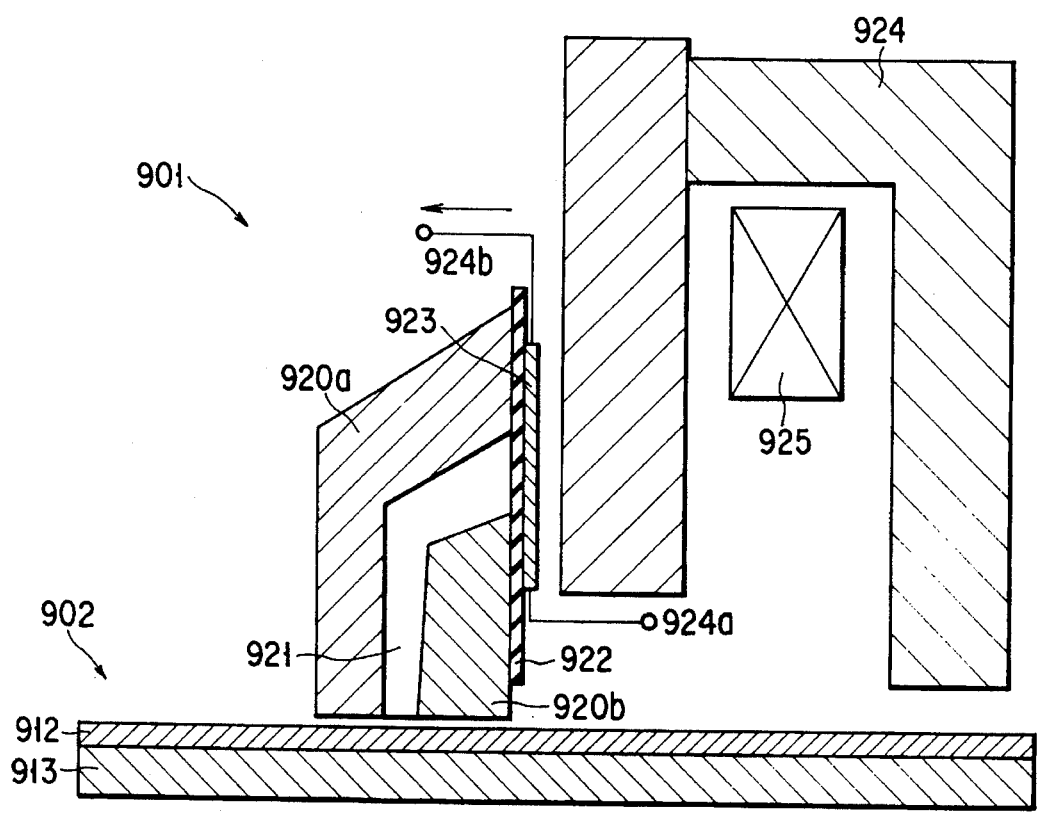

FIG. 47 schematically shows a main part of the magnetic disk memory system according to another embodiment of the present invention, in the form of a cross section cut along a relative moving direction of a magnetic head 901 and a magnetic disk 902. The magnetic head 901 is formed at a front end of a needle-like arm made of ceramics, as has been explained in the foregoing embodiment, although the needle-like arm is omitted from the figure. In addition, insulating films provided between respective members are also omitted from the figure.

In the figure, the needle-like arm made of ceramics has a front end on which main magnetic poles 920a and 920b having a soft magnetism and made of an FeN-based alloy. These main magnetic poles 920a and 920b are provided so as to extend in a direction perpendicular to the surface of a magnetic disk 902. Further, the main magnetic poles 920a and 920b face each other in the track direction, and a non-magnetic interlayer 921 is interposed between the main magnetic poles. The main magnetic poles 920a and 920b are provided in such a manner that an end of each pole is positioned so as to face the magnetic disk 902, and these magnetic poles are curved as they extend away from the magnetic disk 902. Each of the main magnetic poles 920a and 920b has another end provided with an MR element 923 arranged in parallel with the end surfaces of the main magnet poles, with an insulation layer 922 being interposed between these end and the MR element. Upper and lower ends of the MR element 923 are connected with two copper lead lines 924a and 924b, so that a sense current Is can flow through the MR element 923 by the copper lead lines. The non-magnetic interlayer 921 is formed in such a way that the thickness of the interlayer is increased toward the MR element 923. Specifically, the thickness of the interlayer 921 is 0.04 μm at an end portion thereof facing the magnetic disk 902, while the thickness is 0.2 μm at another end portion thereof facing the MR element 923.

A U-shaped return magnetic pole 924 is provided in parallel and adjacent to the MR terminal 923, with an insulation layer being interposed between this magnetic pole and the MR element. In addition, a recording coil 925 is provided so as to be surrounded by the return magnetic pole 924. The return magnetic pole 924 have two arms extending in parallel with each other, and of the arms which faces the MR element 924 is magnetically coupled with the main magnetic poles 920a and 920b. As a result, a recording magnetic field can be efficiently applied to the magnetic disk 902. On the other hand, the other arm of the return magnetic pole 924 is magnetically coupled with a soft magnetic backing layer 912 of the magnetic disk 902. As a result, a magnetic flux generated by the recording coil 925 can effectively be guided.

In this embodiment, the same effects as those of the embodiment 7 can be obtained.

Embodiment 9

Figure 48:
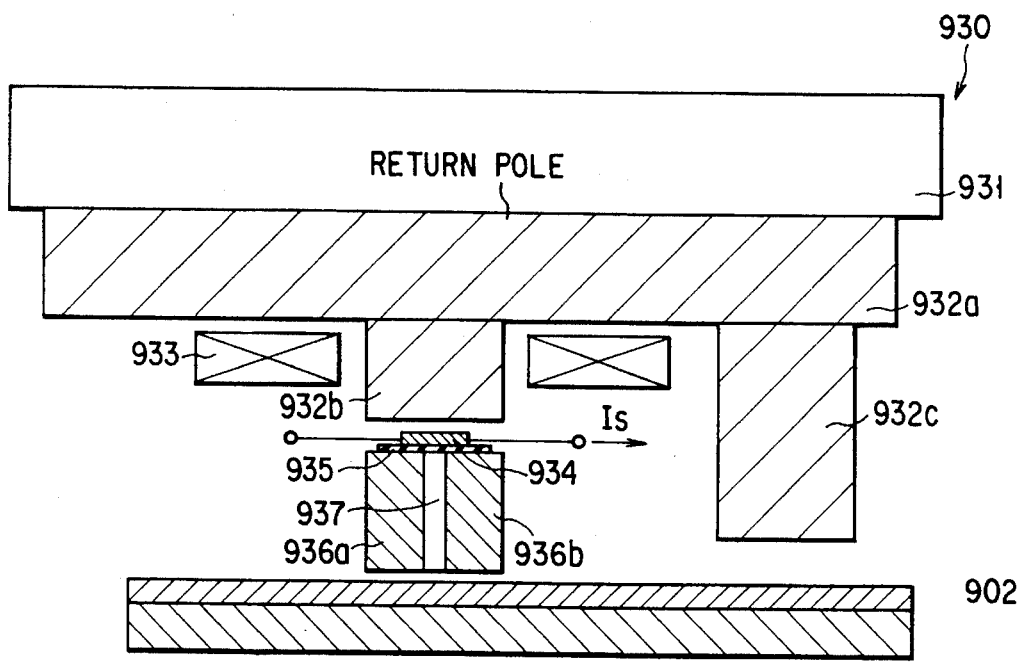

FIG. 48 schematically shows a planar type magnetic head 930 according to another embodiment of the present invention, in form of a cross section cut along a relative moving direction of the magnetic head and a magnetic disk 902. In FIG. 48, insulating films provided between respective members are omitted.

The planar type magnetic head 930 of this embodiment is manufactured by a thin film processing. Specifically, return magnetic poles 932a, 932b, 932c, and a recording coil 933 are formed, one after another, on a head substrate 931, with use of the thin film processing. Then, an MR element 934, an insulation layer 935, main magnet poles 936a and 936b, and a non-magnetic interlayer 937 are formed thereon with an necessary insulating material being inserted.

The planar type magnetic head 930 as stated above is advantageous in that the head can be formed to be extremely thin by using a thin film processing.

Further, in this embodiment, the same effects as those of the embodiment 7 can be obtained.

Embodiment 10

Figure 49:
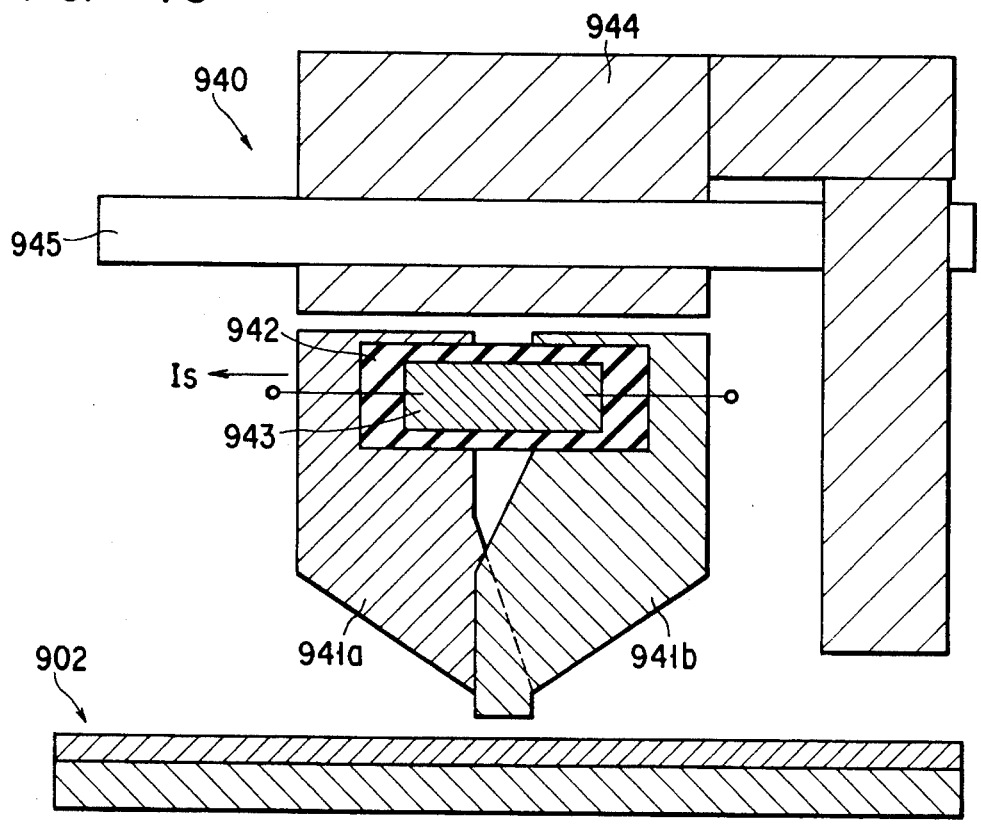

FIG. 49 schematically shows a magnetic head 940 according to another embodiment of the present invention, in the form of a cross section cut along a relative moving direction of the magnetic head and a magnetic disk 902. Also in this figure, insulating films provided between respective members are omitted.

The magnetic head 940 of this embodiment has two main magnetic poles 941a and 941b which are formed with a non-magnetic interlayer (not shown) being interposed therebetween. Each of the main magnetic poles 941a and 941b has a tip end arranged so as to face the magnetic disk 902. In addition, the main magnetic poles 941a and 941b is formed in such a manner that the both main magnetic poles are layered on each other only near the tip end portion thereof. Each of the main magnetic poles 941a and 941b has rear end portion provided with an MR element 943. An insulation layer 942 is interposed between the rear end portion and the MR element. Further, as shown in FIG. 49, a J-shaped return magnetic pole 944 is provided on the main magnetic poles 941a and 941b, with an insulating film (not shown) being interposed between the pole 944 and the poles 941a and 941b. The return magnetic pole 944 is magnetically coupled with the main magnetic poles 941a and 941b, and a recording coil 945 is wound around the return magnetic pole. The recording coil has one turn.

In this embodiment, the same effects as those of the embodiment 7 can be obtained.

Embodiment 11

The magnetic recording/reproducing system of this embodiment comprises the same MR head as shown in FIG. 5. As described in Embodiment 1, the MR element detects the difference, between two main magnetic poles 109a and 109b, in the amount of magnetic flux passing therethrough, thus reproducing a signal.

Figure 50:
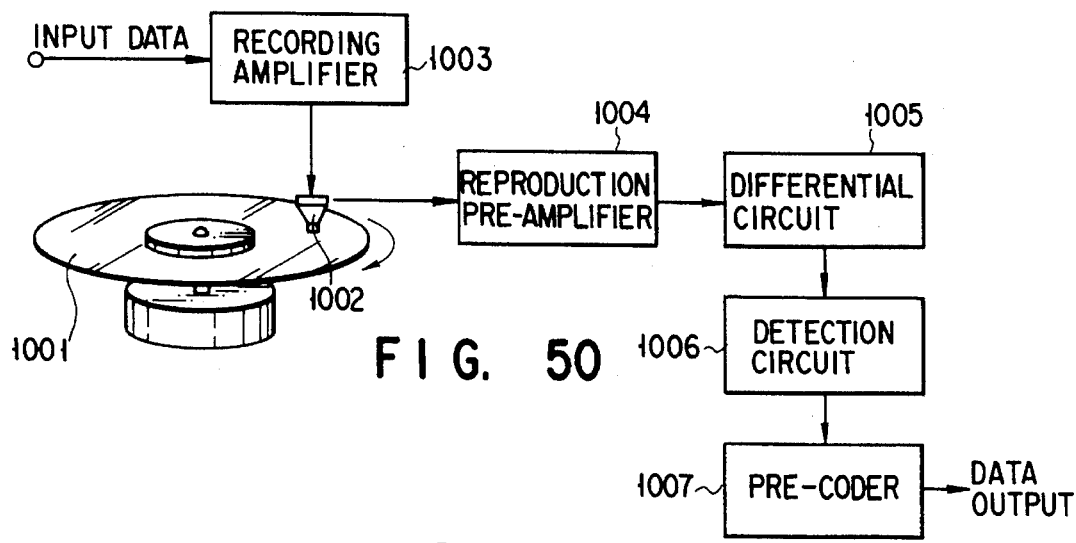
FIGS. 50 and 51 are diagrams for illustrating eleventh embodiment of the magnetic disk memory system according to the present invention.

Further, this magnetic recording/reproducing system includes a reproduction signal processing circuit shown in the block diagram of FIG. 50. Illustrated in this figure are a magnetic disk 1001, a recording/reproducing head 1002, a recording amplifier 1003, a reproduction pre-amplifier 1004, a differential circuit 1005, a detection circuit 1006 and a pre-coder 1007. This processing circuit is characterized by including the differential circuit 1005 and the pre-coder 1007. The differential circuit 1005 is a circuit for differentiating an output from the MR head by a parameter of time. This differential circuit serves to convert a change (shown in FIG. 7) in the reproduction magnetic flux density which interlinks with the MR element, into a reproduction voltage signal shown in FIG. 8. The pre-coder 1007 is a restoration circuit for excluding the interference between adjacent bits, caused by transfer function G when a signal passes through the reproduction head 1002 and the differential circuit 1005. In other words, the pre-coder 1007 carries out a processing of signal based on an inverse function, $G^{-1}$, of the transfer function G.

Figure 51:
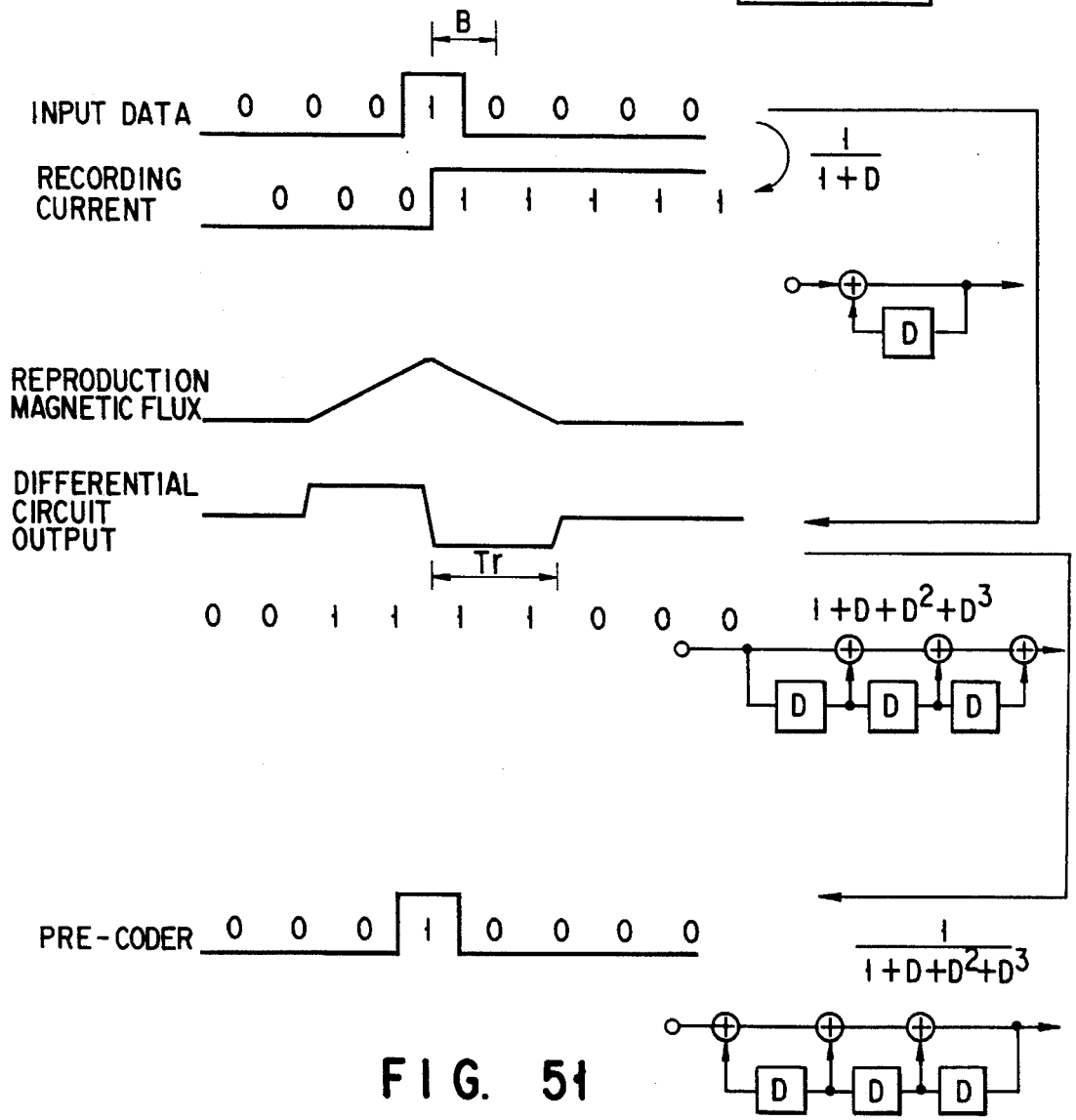

FIG. 51 shows a state of data interference when an input data passes through the recording/reproduction channel, and a state of data restoration by the precoder. The embodiment shown in this figure is a data flow in the case where the distance B between bits, and the thickness Tr of the pair of main magnetic poles 109a and 109b satisfy the following relationship:

$$B < Tr < 3B$$

The transfer function used from data input to the output from the differential circuit 1005 is $$1 + D + D^2 + D^3,$$

whereas the transfer function of the pre-coder 1007 is $$(1 + D + D^2 + D^3)^{-1}.$$

In this embodiment, the pre-coder 1007 is provided in the rear stage of the detection circuit 1006. However, the pre-coder may be provided in the front stage of the recording/reproduction channel, i.e. at the beginning of the input, so as to prevent propagation of an error.

Embodiment 12

Figure 52:
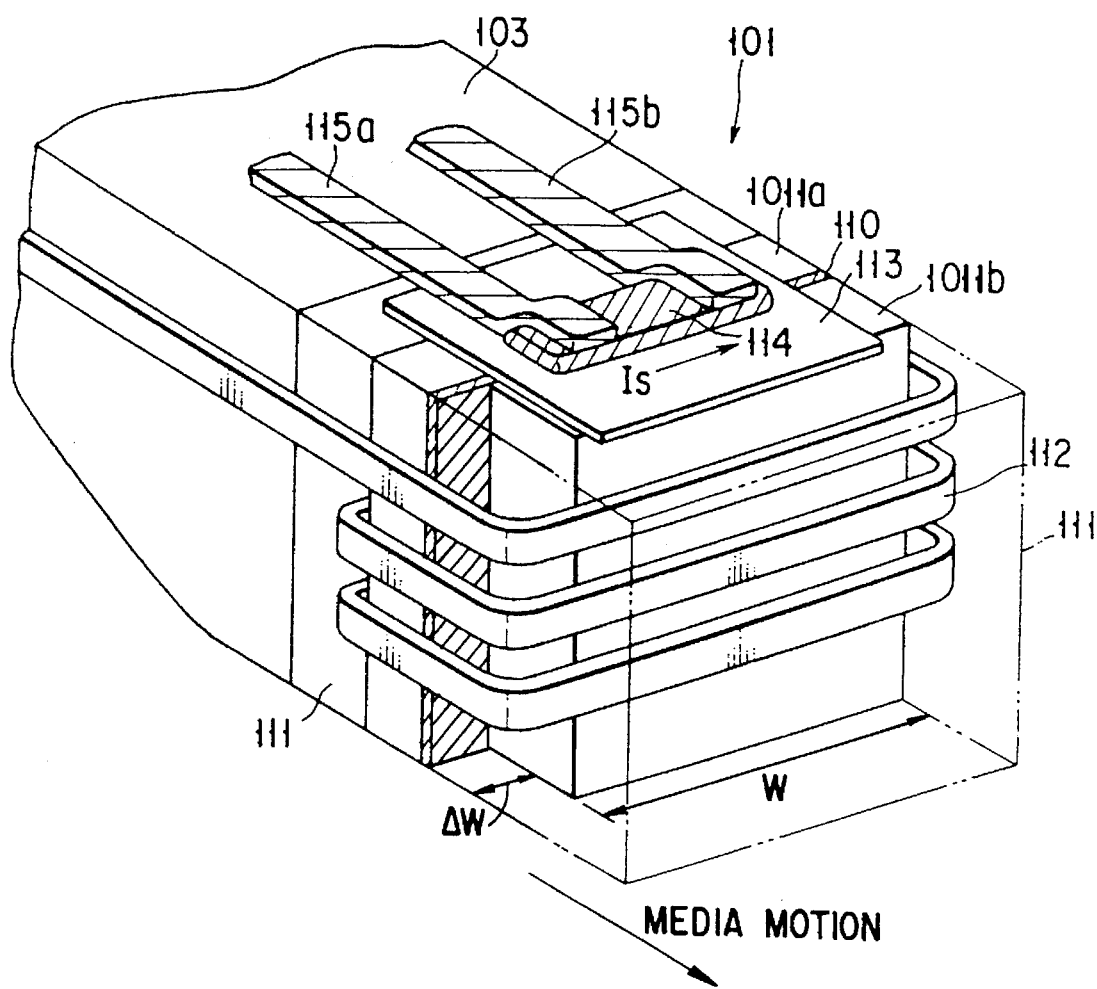
FIGS. 52 and 53 are diagrams for illustrating twelfth embodiment of the magnetic disk memory system according to the present invention.

FIG. 52 is a diagram showing a differential MR head of the same type as shown in FIG. 5, and this head comprises a pair of main magnetic poles 1011a and 1011b, and an MR element 114 provided for the upper ends of the poles. The magnetic pole 1011a which is located on the upstream side of the head with respect to the relative motion direction, that is, the leading side, has an lateral end portion extending more than the corresponding end of the other magnetic pole 1011b by ΔW. Therefore, supposing that the width of the trailing side pole 1011b is W, the width of the pole 1011a was W+ΔW. Apart from the above, the head shown in this figure has the Same structure as that shown in FIG. 5.

The MR head shown in FIG. 52 is arranged in such a manner that its head gap surface is tilted by an angle of θ with respect to the track 1012 of a magnetic disk. With this arrangement, the lateral end portion of the main magnetic pole 1011a extends over the lateral end of the pole 1011b by ΔW in the direction opposite to inclination of the angle θ. Therefore, supposing that the thickness of the main pole 1011b is Tr1 and the gap length is g, the pair of magnetic poles can be made to accurately pass directly above a magnetization transition point 1013 to be reproduced by setting ΔW preferably to (Tr1+g)tan θ or more. Therefore, an accurate reproduction can be achieved without creating a phase error or offset.

Embodiment 13

Figure 54:
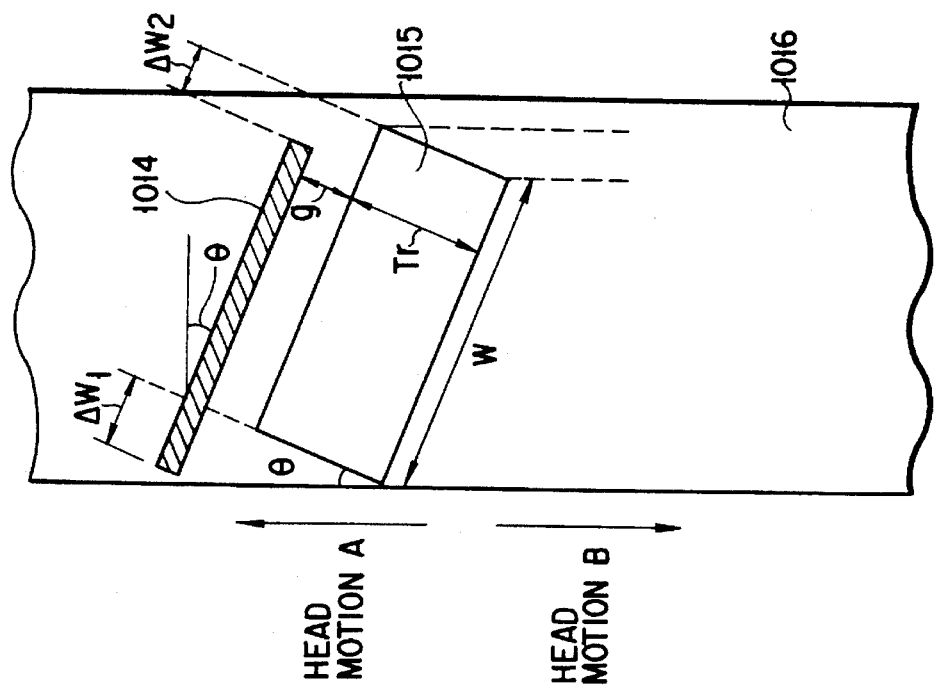
FIG. 54 is a diagram for illustrating thirteenth embodiment of the magnetic disk memory system according to the present invention.
Figure 53:
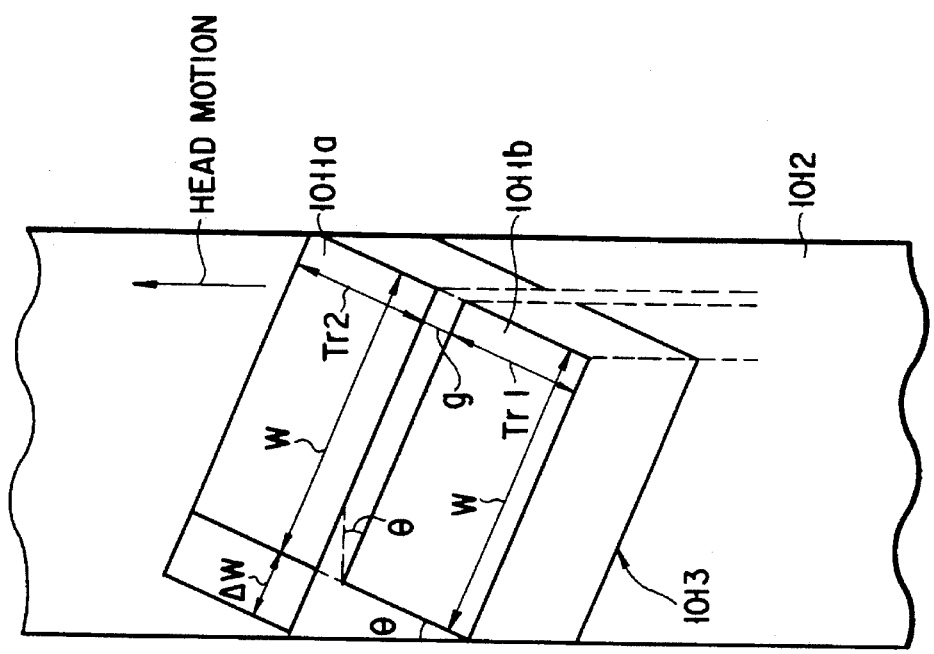

In this embodiment, a magnetic head in which an MR head is disposed adjacent to main magnetic poles as shown in FIG. 18, is used. This magnetic head is arranged as such that longitudinal direction of the lower end surface of the MR reproduction head 1014 is tilted by an angle of θ with respect to the width direction of the recording track 1016. As shown in the figure, the MR head 1014 and the recording head 1015 are arranged to be displaced from each other in the width direction. The displacements ΔW1 and ΔW2 of the lateral ends of the MR head 1014 with reference to both lateral ends of the recording head 1015 are set as follows:

<In the case where the relative motion direction of head is in the direction indicated by arrow A in FIG. 54>:
ΔW1: (g+Tr) tan θ or more
ΔW2: g·sin θ or more <In the case where the relative motion direction of head is in the direction indicated by arrow B in FIG. 54>:
ΔW1: g·tan θ or more
ΔW2: g·sin θ or less Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A magnetic disk memory system comprising:
   a magnetic disk of a perpendicular recording type, including a soft magnetic backing layer and a magnetic recording layer of a perpendicular magnetic anisotropy formed on said backing layer; and
   a magnetic head for writing and reading data with respect to said magnetic disk wherein said magnetic head comprises:
   (a) a pair of main magnetic poles each being made of a material having a high magnetic permeability and each having a first end and a second end, each second end defining a second end surface, said first end of each magnetic pole being located so as to face a surface of said magnetic disk;
   (b) a non-magnetic interlayer provided between said pair of main magnetic poles;
   (c) a recording coil disposed so as to generate a magnetic flux passing through said magnetic disk via said pair of main magnetic poles; and
   (d) an MR element having a film-like shape provided via an insulation layer on each of said second ends of said pair of main magnetic poles, said MR element having a film surface parallel to said second end surfaces of said pair of main magnetic poles, and being magnetically coupled with said pair of main magnetic poles.

2. A magnetic disk memory system according to claim 1, further comprising a return magnetic pole which is magnetically coupled with said pair of main magnetic poles, wherein
   (i) said recording coil is wound around said return magnetic pole; and (ii) a flux generated by said recording coil is allowed to pass through said magnetic disk via said return magnetic pole and said main magnetic poles.

3. A magnetic disk memory system according to claim 1, wherein said magnetic head is a planar type thin film head formed by a thin film process.

4. A magnetic disk memory system according to claim 1, wherein, in said magnetic disk, a film thickness (db) of said soft magnetic backing layer, a saturation magnetic flux density thereof (Bsb), a film thickness of said magnetic recording layer, and a saturation magnetization thereof (Isr) satisfy the following relationship:

$$Bsb.db > Isr.dr.$$

5. A magnetic disk memory system according to claim 1, further comprising means for forming a signal-free region in which no significant signals are substantially present, between adjacent recording tracks of said magnetic disk.

6. A magnetic disk memory system according to claim 5, wherein a width (Tw) of said recording tracks in said magnetic disk, a track pitch (Tp) of said recording tracks, and a width (G) of said signal-free region satisfy the following relationship:

$$G > Tp - Tw.$$

7. A magnetic disk memory system according to claim 5, wherein a thickness (Tr) of said main magnetic poles of said magnetic head, and a distance (dsw+dp) between distal ends of said main magnetic poles and the magnetization recording layer of said magnetic disk satisfy the following relationship:

$$2(dsw+dp) < Tr.$$

8. A magnetic disk memory system according to claim 1, further comprising a contact slider joined to an appropriate fixation end which is contained in an aligning mechanism for said magnetic head, via a support member having a spring property, said contact slider being brought into contact with the surface of said magnetic disk by a spring force of said support member, wherein
said magnetic head is mounted on said contact slider so that the magnetic head is brought into contact with the surface of said magnetic disk.

9. A magnetic disk memory system according to claim 8, wherein said support member has a returned beam structure including a first beam extending from said fixation end in a first direction, and a second beam extending from a distal end of said first beam in a second direction opposite to that of said first beam, and said contact slider is provided on a distal end of the second beam.

10. A magnetic disk memory system according to claim 8, further comprising a flying slider which is contained in the aligning mechanism for said magnetic head, said flying slider being provided above said magnetic disk, and flying at a height where a hydrodynamic force due to a motion of air flow accompanying rotation of said magnetic disk are balanced with a press-down load externally applied, wherein
(i) said contact slider is joined to said flying slider via said support member; and
(ii) most of the press-down load applied on said flying slider is canceled by the hydrodynamic force of said flying slider, and only a portion of the press-down load not cancelled by the hydrodynamic force is applied on said contact slider.

11. A magnetic disk memory system according to claim 10, wherein said support member has a returned beam structure including a first beam extending from said fixation end in one direction, and a second beam extending from a distal end of the first beam in a direction opposite to that of said first beam, and said contact slider is provided on a distal end of said second beam.

12. A magnetic disk memory system comprising: a magnetic disk of a perpendicular recording type, including a soft magnetic backing layer and a magnetic recording layer of a perpendicular magnetic anisotropy formed on the backing layer; and a magnetic head for writing and reading data with respect to said magnetic disk;

wherein
(a) said magnetic head comprises a soft magnetic film for recording or magnetic shielding, and an MR element for reproducing which is located close to said soft magnetic film, said soft magnetic film and said MR element being disposed in such a way that the ends thereof face the surface of said magnetic disk;

(b) a following relationship is satisfied, $$Tm < \lambda min < Tm + g;$$

where Tm represents a film thickness of said MR element, g represents a distance between said MR element and said soft magnetic film, and λ min represents a minimum recording wavelength; and (c) an average diameter of magnetic crystalline grains constituting said magnetic recording layer of said magnetic disk is smaller than the film thickness Tm of said MR element.

13. A magnetic disk memory system according to claim 12, wherein, in said magnetic disk, a film thickness (db) of said soft magnetic backing layer, a saturation magnetic flux density thereof (Bsb), a film thickness of said magnetization recording layer, and a saturation magnetization thereof (Isr) satisfy the following relationship:

$$Bsb.db > Isr.dr.$$

14. A magnetic disk memory system according to claim 12, further comprising means for forming a signal-free region where no significant signals are substantially present, between adjacent recording tracks of said magnetic disk.

15. A magnetic disk memory system according to claim 14, wherein a width (Tw) of said recording tracks in said magnetic disk, a track pitch (Tp) of said recording tracks, and a width (G) of said signal-free region satisfy the following relationship:

$$G > Tp - Tw.$$

16. A magnetic disk memory system according to claim 12, wherein a thickness (Tr) of said soft magnetic film for use as a recording pole of said magnetic head, and a distance (dsw+dp) between the distal end of said soft magnetic film and said magnetic film and said magnetic recording layer of said magnetic disk satisfy the following relationship:

$$2(dsw+dp) < Tr.$$

17. A magnetic disk memory system according to claim 12, further comprising a contact slider joined to an appropriate fixation end which is contained in an aligning mechanism for said magnetic head, via a support member having a spring property, said contact slider being brought into contact with the surface of said magnetic disk by means of a spring force of said support member, wherein said magnetic head is mounted on said contact slider so that said magnetic head is brought into contact with the surface of said magnetic disk.

18. A magnetic disk memory system according to claim 17, wherein said support member has a returned beam structure including a first beam extending from said fixation end in one direction, and a second beam extending from a distal end of said first beam in a direction opposite to that of said first beam, and said contact slider is provided on a distal end of said second beam.

19. A magnetic disk memory system according to claim 17, further comprising a flying slider which is contained in the aligning mechanism for said magnetic head, said flying slider being provided above said magnetic disk, and flying at a height where a hydrodynamic force due to an action of air flow accompanying rotation of said magnetic disk is balanced with a press-down load externally applied on said slider, wherein (i) said contact slider is joined to said flying slider via said support member; and (ii) most of the press-down load applied on said flying slider is canceled by said hydrodynamic force of said flying slider, and only a portion of the press-down load not cancelled by the hydrodynamic force is applied on said contact slider.

20. A magnetic disk memory system according to claim 19, wherein said support member has a returned beam structure including a first beam extending from said fixation end in one direction, and a second beam extending from a distal end of said first beam in a direction opposite to that of said first beam, and said contact slider is provided on a distal end of said second beam.

* * * * *